US012689892B2

(12) United States Patent
Guo et al.

(10) Patent No.: US 12,689,892 B2
(45) Date of Patent: Jul. 21, 2026

(54) COMMUNICATION METHOD AND APPARATUS

(71) Applicant: HUAWEI TECHNOLOGIES CO., LTD., Shenzhen (CN)

(72) Inventors: Longhua Guo, Shanghai (CN); He Li, Shanghai (CN); Yizhuang Wu, Beijing (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 18/166,140

(22) Filed: Feb. 8, 2023

(65) Prior Publication Data

US 2023/0188976 A1     Jun. 15, 2023

Related U.S. Application Data

(63) Continuation of application No. PCT/CN2020/108300, filed on Aug. 10, 2020.

(51) Int. Cl.
*H04W 12/033* (2021.01)
*H04W 12/106* (2021.01)
*H04W 80/02* (2009.01)

(52) U.S. Cl.
CPC ....... *H04W 12/033* (2021.01); *H04W 12/106* (2021.01); *H04W 80/02* (2013.01)

(58) Field of Classification Search
CPC . H04W 12/033; H04W 12/106; H04W 80/02; H04W 76/40; H04W 4/06
See application file for complete search history.

(56) References Cited

U.S. PATENT DOCUMENTS

| | | | | |
|---|---|---|---|---|
| 10,674,469 | B2 * | 6/2020 | Kim | H04W 76/27 |
| 2011/0188408 | A1 | 8/2011 | Yi et al. | |

(Continued)

FOREIGN PATENT DOCUMENTS

| | | |
|---|---|---|
| CN | 109218325 A | 1/2019 |
| CN | 109391981 A | 2/2019 |

(Continued)

OTHER PUBLICATIONS

SA3, "LS to RAN2/3 on EDT data integrity protection", 3GPP TSG-RAN WG3 #103, 3GPP TSG-SA WG3 Meeting #94, R3-190118, Feb. 25, 2019-Mar. 1, 2019; 2 total pages.

(Continued)

*Primary Examiner* — SM A Rahman
(74) *Attorney, Agent, or Firm* — Rimon PC

(57) ABSTRACT

Embodiments of this application provide a communication method and a related apparatus, to meet a multicast service data packet transmission security requirement. An access device may determine a user plane security active state of a multicast data radio bearer (DRB) in a protocol data unit (PDU) session, and indicate the user plane security active state of the multicast DRB to a terminal. The user plane security active state includes whether integrity protection is activated and/or whether confidentiality protection is activated. In addition, the access device configures a multicast packet data convergence protocol (PDCP) layer entity based on the user plane security active state of the DRB for transmitting multicast service data. The access device may further determine a user plane security active state of a unicast DRB, indicate the user plane security active state to the terminal, and modify a unicast PDCP layer entity.

16 Claims, 13 Drawing Sheets

(56) References Cited

U.S. PATENT DOCUMENTS

| | | | | |
|---|---|---|---|---|
| 2018/0124578 | A1 | 5/2018 | Sedlacek et al. | |
| 2019/0297502 | A1 | 9/2019 | Jo et al. | |
| 2020/0092685 | A1* | 3/2020 | Fehrenbach | H04W 72/23 |
| 2020/0137643 | A1 | 4/2020 | Li et al. | |
| 2020/0169888 | A1* | 5/2020 | Yang | H04L 63/205 |
| 2021/0234717 | A1* | 7/2021 | Speicher | H04W 36/0016 |
| 2021/0329457 | A1* | 10/2021 | Vutukuri | H04L 63/123 |

FOREIGN PATENT DOCUMENTS

| | | | |
|---|---|---|---|
| CN | 111357309 | A | 6/2020 |
| CN | 111406415 | A | 7/2020 |
| EP | 3541105 | A1 | 9/2019 |

OTHER PUBLICATIONS

LG Electronics: "Clean up of TR 33.836", 3GPP Draft; S3-201660, vol. SA WG3, No. e-meeting; Aug. 7, 2020, KP051916191 ,total 42 pages.

\* cited by examiner

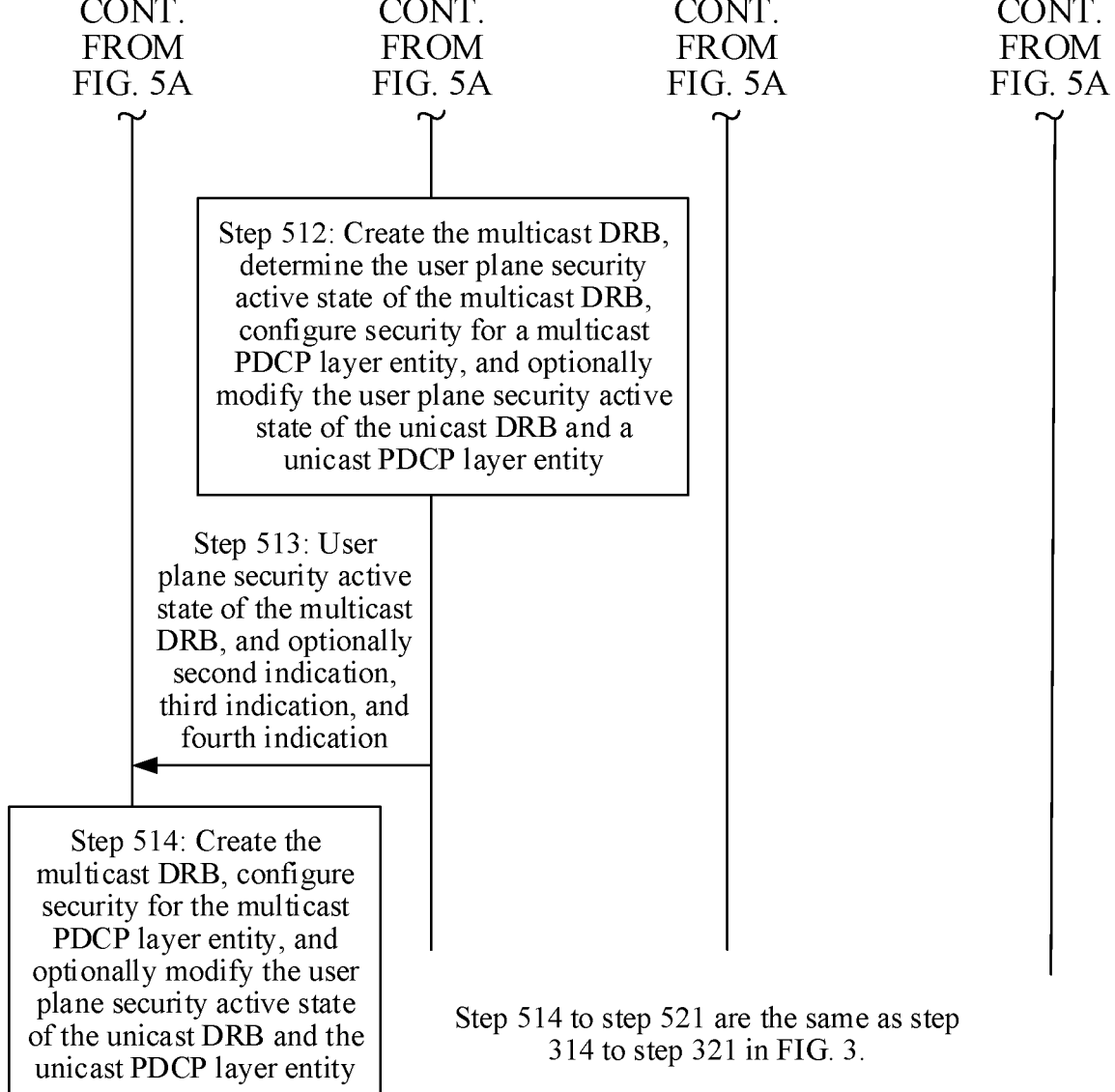

CONT. FROM FIG. 5A          CONT. FROM FIG. 5A          CONT. FROM FIG. 5A          CONT. FROM FIG. 5A

Step 512: Create the multicast DRB, determine the user plane security active state of the multicast DRB, configure security for a multicast PDCP layer entity, and optionally modify the user plane security active state of the unicast DRB and a unicast PDCP layer entity Step 513: User plane security active state of the multicast DRB, and optionally second indication, third indication, and fourth indication Step 514: Create the multicast DRB, configure security for the multicast PDCP layer entity, and optionally modify the user plane security active state of the unicast DRB and the unicast PDCP layer entity Step 514 to step 521 are the same as step 314 to step 321 in FIG. 3.

FIG. 5B

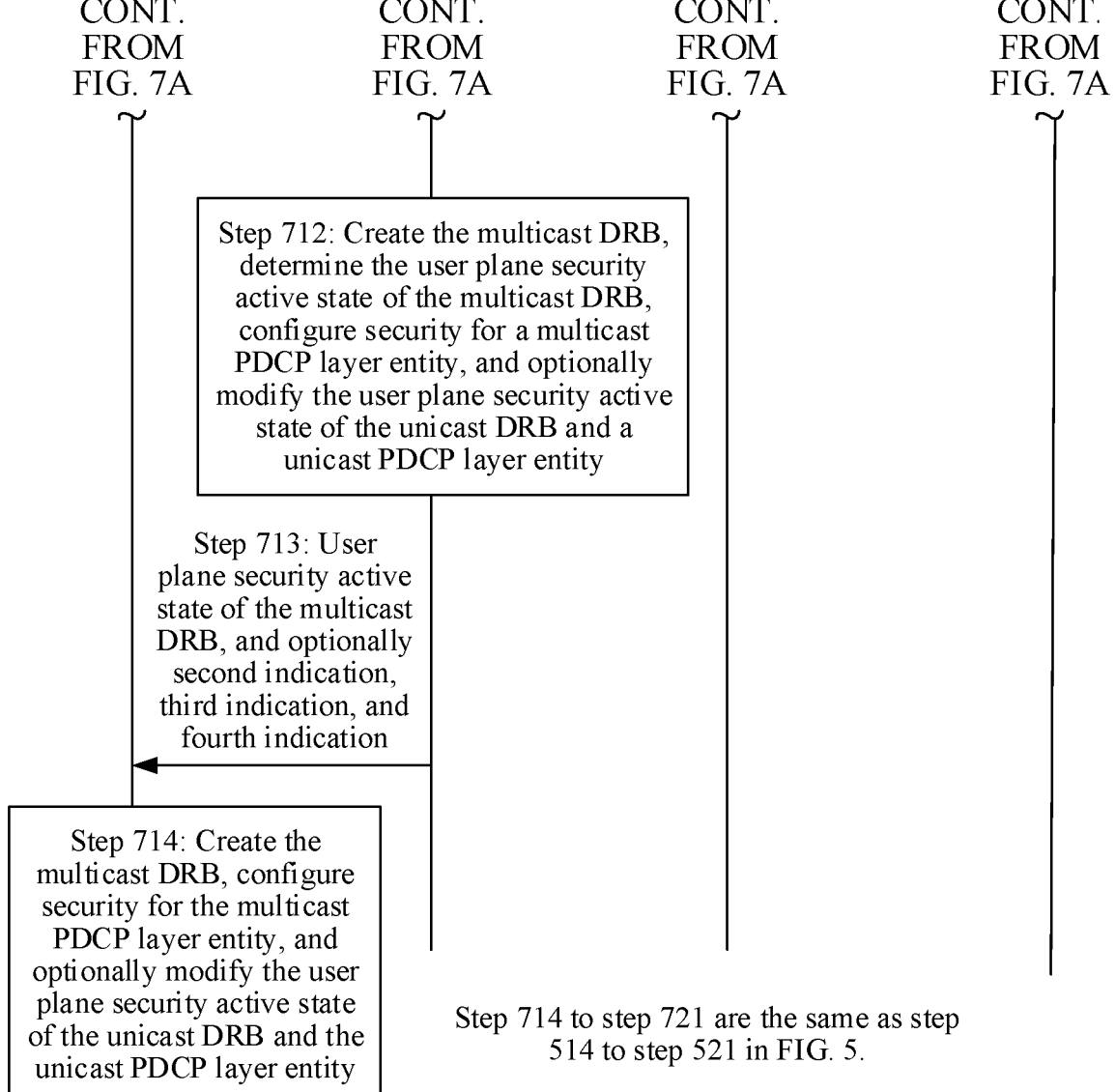

CONT.
FROM
FIG. 7A

CONT.
FROM
FIG. 7A

CONT.
FROM
FIG. 7A

CONT.
FROM
FIG. 7A

Step 712: Create the multicast DRB, determine the user plane security active state of the multicast DRB, configure security for a multicast PDCP layer entity, and optionally modify the user plane security active state of the unicast DRB and a unicast PDCP layer entity Step 713: User plane security active state of the multicast DRB, and optionally second indication, third indication, and fourth indication Step 714: Create the multicast DRB, configure security for the multicast PDCP layer entity, and optionally modify the user plane security active state of the unicast DRB and the unicast PDCP layer entity Step 714 to step 721 are the same as step 514 to step 521 in FIG. 5.

FIG. 7B

Communication apparatus 900

Communication apparatus 1000

Communication apparatus 1100

Communication apparatus 1200

COMMUNICATION METHOD AND APPARATUS

CROSS-REFERENCE TO RELATED APPLICATIONS

This application is a continuation of International Application No. PCT/CN2020/108300, filed on Aug. 10, 2020, the disclosure of which is hereby incorporated by reference in its entirety.

TECHNICAL FIELD

Embodiments of this application generally relate to the field of wireless communication technologies, and in particular, to a communication method and an apparatus.

BACKGROUND

In current wireless networks, there are a plurality of types of services, for example, such as a unicast service and a multicast service. Security requirements of these two types of data, the unicast service and the multicast service, may be different. For example, the multicast service may be an online live telecasting sports event with copyrighted information, and a multicast service data packet may have an encryption security requirement. In some examples, the multicast service may be an online live telecasting public news, and a multicast service data packet may not have an encryption security requirement. In another example, the unicast service may be a sports event with copyrighted information that is replayed by a terminal, and a unicast service data packet may have an encryption security requirement. In some examples, the unicast service may be on demand public news by a terminal, and a unicast service data packet may not have an encryption security requirement.

In an existing mechanism, after completing registration, the terminal sets up a unicast transmission link between the terminal and a network through a protocol data unit (PDU) session setup procedure, to transmit a unicast service data packet between the terminal and the network. When a multicast service data packet needs to be transmitted between the terminal and the network, the terminal initiates a multicast service join process. Currently, because an access device or the terminal does not have a capability of using a multicast transmission mode, the multicast service data packet also needs to be sent to the terminal in a unicast transmission link mode. In this case, data of two types of services, namely, unicast service data and multicast service data, needs to be transmitted in a same PDU session. In this scenario, how to ensure transmission security of the multicast service data packet is a problem that needs to be resolved.

SUMMARY

This application provides a communication method and an apparatus, to ensure a multicast service data packet transmission security requirement.

According to a first aspect, a communication method is provided. The method includes that an access device sends a first message to a terminal, where the first message includes a first indication, the first indication is used to indicate a user plane security active state of a data radio bearer (DRB), for transmitting multicast service data, in a protocol data unit (PDU) session, and the user plane security active state includes whether integrity protection is activated and/or whether confidentiality protection is activated. The method further includes that the access device configures a multicast packet data convergence protocol (PDCP) layer entity based on the user plane security active state of the DRB for transmitting the multicast service data.

The user plane security active state of the DRB for transmitting a multicast service data packet, that is indicated by the first indication may be the same as or different from a user plane security active state of a DRB, for transmitting a unicast service data packet, in the PDU session. A sequence of sending, by the access device, the first message to the terminal and configuring, by the access device, the multicast PDCP layer entity is not limited.

In a conventional technology, in a PDU session, a user plane security active state is at a PDU session granularity: For example, a user plane security active state of a multicast DRB may use a user plane security active state of a unicast DRB as a baseline by default. However, in some embodiments, the access device may indicate the user plane security active state of the multicast DRB to the terminal, and the terminal may determine the user plane security active state of the multicast DRB based on the first indication of the access device. In comparison with a manner in which the user plane security active state of the unicast DRB is used as a baseline by default, this indication manner can more flexibly determine the user plane security active state of the multicast DRB, and is more applicable to a multicast service data transmission security requirement.

In a possible implementation, before an access device sends a first message to a terminal, the access device may first determine, based on a first parameter set, the user plane security active state of the DRB for transmitting the multicast service data packet, where the first parameter set includes but is not limited to one or both of the following parameters: the user plane security active state of the DRB, for transmitting unicast service data, in the PDU session, and a multicast security policy. The multicast security policy herein may be obtained by the access device from a session management function (SMF), and the multicast security policy may be generated based on subscription information.

The access device determines the user plane security active state of the multicast DRB based on a plurality of parameters. This can more flexibly determine the user plane security active state of the multicast DRB, and is more applicable to the multicast service data transmission security requirement.

In a possible implementation, when the access device determines the user plane security active state of the DRB for transmitting the multicast service data packet, specifically, the access device may determine the user plane security active state of the DRB, for transmitting the unicast service data, in the PDU session as the user plane security active state of the DRB for transmitting the multicast service data. In other words, the multicast security policy may not be considered, the user plane security active state of the multicast DRB is determined by using the user plane security active state of the unicast DRB as a baseline, and the user plane security active state of the unicast DRB is the same as that of the multicast DRB.

In a possible implementation, when the user plane security active state of the DRB for transmitting the unicast service data is on (where being "on" may be equivalent to that the user plane security active state is active), the access device determines the user plane security active state of the DRB, for transmitting the unicast service data, in the PDU session as the user plane security active state of the DRB for transmitting the multicast service data. When the user plane security active state of the unicast DRB is on, the integrity protection is activated and/or the confidentiality protection is activated. In this case, the user plane active state of the unicast DRB is used as a baseline, so that the determined user plane security active state of the multicast DRB is also in an active state, to ensure the multicast transmission security requirement.

In a possible implementation, when the user plane security active state of the DRB for transmitting the unicast service data is off (where being "off" may be equivalent to that the user plane security active state is inactive), and the multicast security policy is a preferred policy or a "not needed" policy, the access device determines the user plane security active state of the DRB, for transmitting the unicast service data, in the PDU session as the user plane security active state of the DRB for transmitting the multicast service data, where the preferred policy is used to indicate that the user plane security active state of the DRB for transmitting the multicast service data is on or off, and the "not needed" policy is used to indicate that the user plane security active state of the DRB for transmitting the multicast service data is off.

When the multicast security policy indicates that the user plane security active state can be off or on, secure transmission is not forcibly on for a multicast service. In this case, the user plane security active state of the unicast DRB is used as a baseline. When the user plane security active state of the unicast DRB is off, the determined user plane security active state of the multicast DRB is also in an off (e.g., inactive) state, to avoid transmission complexity caused by performing security protection on the multicast service.

In a possible implementation, when the access device determines the user plane security active state of the DRB for transmitting the multicast service data packet, specifically, the access device may determine, based on the multicast security policy; the user plane security active state of the DRB for transmitting the multicast service data, where the multicast security policy is a required policy, a preferred policy, or a "not needed" policy. The required policy is used to indicate that the user plane security active state of the DRB for transmitting the multicast service data is on, the preferred policy is used to indicate that the user plane security active state of the DRB for transmitting the multicast service data is on or off, and the "not needed" policy is used to indicate that the user plane security active state of the DRB for transmitting the multicast service data is off. In other words, the user plane security active state of the unicast DRB may not be considered, and the user plane security active state of the multicast DRB is determined by using the multicast security policy as a baseline. In this way, the multicast service transmission security requirement can be better met.

In a possible implementation, when the user plane security active state of the DRB for transmitting the unicast service data is on or off (where being on may be equivalent to that the user plane security active state is active, and being off may be equivalent to that the user plane security active state is inactive), and the multicast security policy is a required policy (where the required policy is used to indicate that the user plane security active state of the DRB for transmitting the multicast service data is on) or a "not needed" policy (where the "not needed" policy is used to indicate that the user plane security active state of the DRB for transmitting the multicast service data is off), the access device determines, based on the multicast security policy, the user plane security active state of the DRB, for transmitting the multicast service data, in the PDU session.

In some embodiments, when the multicast security policy is the required policy, it indicates that the user plane security state of the multicast DRB is on (e.g., active). In this case, regardless of whether the user plane security active state of the unicast DRB is on, the user plane security active state of the multicast DRB may be determined based on the multicast security policy, to ensure the multicast service transmission security requirement. When the multicast security policy is the "not needed" policy, it indicates that the user plane security active state of the multicast DRB is off (e.g., inactive). In this case, regardless of whether the user plane security active state of the unicast DRB is on, the user plane security active state of the multicast DRB may be determined based on the multicast security policy, to meet the multicast service transmission security requirement, and avoid transmission complexity caused by performing security protection on the multicast service.

In a possible implementation, the first message sent by the access device to the terminal further includes but is not limited to one or more of the following indications: a second indication, a third indication, and a fourth indication. The second indication is used to indicate the terminal to modify the user plane security active state of the DRB, for transmitting the unicast service data, in the PDU session to the user plane security active state of the DRB for transmitting the multicast service data, or the second indication is used to indicate a modified user plane security active state of the DRB, for transmitting the unicast service data, in the PDU session. The user plane security active state of the DRB for transmitting the unicast service data, that is indicated by the second indication is usually the same as the user plane security active state of the DRB for transmitting the multicast service data. The third indication is an identifier of the DRB whose user plane security active state needs to be modified. The identifier of the DRB herein is an identifier of the DRB for transmitting the unicast service data. The fourth indication is used to indicate the terminal to modify the user plane security active state of the DRB, for transmitting the unicast service data, in the PDU session, and the fourth indication may be used to explicitly indicate the terminal to modify the user plane security active state of the DRB for transmitting the unicast service data.

The access device delivers one or more of the second indication, the third indication, and the fourth indication to the terminal, so that the terminal modifies the user plane security active state of the unicast DRB based on the user plane security active state of the multicast DRB, to meet a unicast service transmission security requirement. Certainly, in this application, it may be pre-specified in a protocol that the user plane active state of the unicast DRB uses the user plane security active state of the multicast DRB as a baseline. In other words, the access device does not deliver one or more of the second indication, the third indication, and the fourth indication to the terminal, and the terminal may also modify the user plane security active state of the unicast DRB based on the user plane security active state of the multicast DRB, that is indicated by the first indication.

In a possible implementation, when the user plane security active state of the DRB for transmitting the unicast service data is off or on, and the multicast security policy is required, the access device sends the first message to the terminal. Optionally, the first message includes one or more of the second indication, the third indication, and the fourth indication. When the multicast security policy is required, it indicates that the user plane security active state of the multicast DRB is on. In this case, the user plane security active state of the multicast DRB is used as a baseline, and the determined user plane security active state of the unicast DRB is also on, so that the unicast service transmission security requirement can be ensured, and service transmission security is not degraded.

According to a second aspect, a communication method is provided. A terminal receives a first message from an access device, where the first message is used to indicate a user plane security active state of a DRB, for transmitting multicast service data, in a PDU session, and the user plane security active state includes whether integrity protection is activated and/or whether confidentiality protection is activated. The method further includes that the terminal configures a multicast PDCP layer entity based on the user plane security active state of the DRB for transmitting the multicast service data.

In conventional technologies, in a PDU session, a user plane security active state of a multicast DRB may use a user plane security active state of a unicast DRB as a baseline by default. However, in some embodiments, the access device may indicate the user plane security active state of the multicast DRB to the terminal, and the terminal may determine the user plane security active state of the multicast DRB based on first indication of the access device. In comparison with a manner in which the user plane security active state of the unicast DRB is used as a baseline by default, this indication manner can more flexibly determine the user plane security active state of the multicast DRB, and is more applicable to a multicast service data transmission security requirement.

In a possible implementation, the first message further includes but is not limited to one or more of the following indications: a second indication, a third indication, and a fourth indication. The second indication is used to indicate the terminal to modify a user plane security active state of a DRB, for transmitting unicast service data, in the PDU session to the user plane security active state of the DRB for transmitting the multicast service data, or the second indication is used to indicate a modified user plane security active state of a DRB, for transmitting unicast service data, in the PDU session. The user plane security active state of the DRB for transmitting the unicast service data, that is indicated by the second indication is usually the same as the user plane security active state of the DRB for transmitting the multicast service data. The third indication is an identifier of the DRB whose user plane security active state needs to be modified. The identifier of the DRB herein is an identifier of the unicast DRB. The fourth indication is used to indicate the terminal to modify the user plane security active state of the DRB, for transmitting the unicast service data, in the PDU session, and the fourth indication may be used to explicitly indicate the terminal to modify the user plane security active state of the DRB for transmitting the unicast service data.

In a possible implementation, when the first message includes the second indication, the terminal modifies, based on the user plane security active state of the DRB for transmitting the multicast service data or the modified user plane security active state of the DRB for transmitting the unicast service data, the user plane security active state of the DRB for transmitting the unicast service data.

In a possible implementation, when the first message includes the third indication, the terminal modifies the user plane security active state of the identified DRB.

In a possible implementation, when the first message includes the fourth indication, the terminal modifies the user plane security active state of the DRB for transmitting the unicast service data.

The access device delivers one or more of the second indication, the third indication, and the fourth indication to the terminal, so that the terminal modifies the user plane security active state of the unicast DRB based on the user plane security active state of the multicast DRB, to meet a unicast service transmission security requirement. Certainly, in this application, it may be pre-specified in a protocol that the user plane active state of the unicast DRB uses the user plane security active state of the multicast DRB as a baseline. In other words, the access device does not deliver one or more of the second indication, the third indication, and the fourth indication to the terminal, and the terminal may also modify the user plane security active state of the unicast DRB based on the user plane security active state of the multicast DRB, that is indicated by the first indication.

According to a third aspect, a communication method is provided. When rejecting multicast service data transmission, an access device sends a first message to an SMF device, where the first message includes a first indication, and the first indication is used to indicate that the access device rejects the multicast service data transmission. After receiving the first message from the access device, the SMF device may send, to an access and mobility management function (AMF) device or a user plane function (UPF) device, the first indication indicating that the access device rejects the multicast service data transmission, to notify the AMF device or the UPF device that the access device rejects the multicast service data transmission, so that the AMF device or the UPF device performs corresponding processing.

In a possible implementation, the first message may further include a second indication, and the second indication is used to indicate a reason why the access device rejects the multicast service data transmission. The access device not only notifies the SMF device that the access device rejects the multicast transmission, but also notifies the SMF device of the rejection reason, so that the SMF device may perform corresponding processing. In some cases, the second indication and the first indication may alternatively be a same indication.

In a possible implementation, the reason for rejecting the multicast service data transmission includes: a multicast service data transmission security requirement in the PDU session is inconsistent with a unicast service data transmission security requirement, or a multicast service transmission security requirement cannot be met.

In a possible implementation, the access device may further determine, based on a user plane security active state of a DRB, for transmitting unicast service data, in the PDU session and a multicast security policy; to reject the multicast service data transmission.

In a possible implementation, when the user plane security active state of the DRB for transmitting the unicast service data is on, and the multicast security policy is a "not needed" policy, the access device determines to reject the multicast service data transmission, where the "not needed" policy is used to indicate that a user plane security active state of a DRB for transmitting multicast service data is off.

In a possible implementation, when the user plane security active state of the DRB for transmitting the unicast service data is off, and the multicast security policy is a required policy, the access device determines to reject the multicast service data transmission, where the required policy is used to indicate that a user plane security active state of a DRB for transmitting multicast service data is on.

In the two possible implementations, if the user plane security active state of the unicast DRB is inconsistent with the user plane security active state of the multicast DRB, that is indicated by the multicast security policy, the multicast service transmission may be rejected.

In addition, it should be noted that the multicast security policy according to any one of the first aspect to the third aspect and the possible implementations of the first aspect to the third aspect may be a second multicast security policy in another embodiment, and the second multicast security policy may be a multicast security policy in a multicast context.

According to a fourth aspect, a communication method is provided. An SMF device sends a first message to an access device through an AMF device, where the first message includes a first multicast security policy in a PDU session, the first multicast security policy is a required policy or a "not needed" policy, the required policy indicates that a user plane security active state of a DRB for transmitting multicast service data is on, and the "not needed" policy indicates that the user plane security active state of the DRB for transmitting the multicast service data is off.

The user plane security active state of the DRB for transmitting the multicast service data packet, that is indicated by the first multicast security policy, may be the same as or different from a user plane security active state of a DRB, for transmitting a unicast service data packet in the PDU session. In conventional technologies, in a PDU session, a user plane security active state is at a PDU session granularity. For example, a user plane security active state of a multicast DRB may use a user plane security active state of a unicast DRB as a baseline by default. However, in some embodiments, the SMF device indicates the first multicast security policy to the access device, and the access device may determine the user plane security active state of the multicast DRB based on the first multicast security policy. In comparison with a manner in which the user plane security active state of the unicast DRB is used as a baseline by default, this manner can more flexibly determine the user plane security active state of the multicast DRB, and is more applicable to a multicast service data transmission security requirement.

In a possible implementation, before an SMF device sends a first message to an access device through an AMF device, the SMF device determines the first multicast security policy based on a second parameter set, where the second parameter set includes one or both of the following parameters: a user plane security active state of a DRB for transmitting unicast service data in the PDU session, and a second multicast security policy. The SMF device determines the user plane security active state of the multicast DRB based on a plurality of parameters. This can more flexibly determine the user plane security active state of the multicast DRB, and is more applicable to the multicast service data transmission security requirement. The second multicast security policy herein may be a multicast security policy in a multicast context.

In a possible implementation, the SMF device determines the first multicast security policy based on the user plane security active state of the DRB, for transmitting the unicast service data, in the PDU session. Specifically: the user plane security active state of the DRB for transmitting the unicast service data is determined as the user plane security active state of the DRB for transmitting the multicast service data, and then the first multicast security policy is determined based on the determined user plane security active state of the DRB for transmitting the multicast service data. For example, when the user plane security active state of the DRB for transmitting the multicast (or unicast) service data is on, the first multicast security policy is required: or when the user plane security active state of the DRB for transmitting the multicast (or unicast) service data is off, the first multicast security policy is not needed. In other words, the multicast security policy may not be considered, the user plane security active state of the multicast DRB is determined by using the user plane security active state of the unicast DRB as a baseline, and the user plane security active state of the unicast DRB is the same as that of the multicast DRB.

In a possible implementation, when the user plane security active state of the DRB for transmitting the unicast service data is on, the SMF device determines the first multicast security policy based on the user plane security active state of the DRB for transmitting the unicast service data in the PDU session: or when the user plane security active state of the DRB for transmitting the unicast service data is off, and the second multicast security policy in the multicast context is a preferred policy or a "not needed" policy, the SMF device determines the first multicast security policy based on the user plane security active state of the DRB for transmitting the unicast service data in the PDU session. In these implementations, the preferred policy is used to indicate that the user plane security active state of the DRB for transmitting the multicast service data is on or off, and the "not needed" policy is used to indicate that the user plane security active state of the DRB for transmitting the multicast service data is off.

When the second multicast security policy indicates that the user plane security active state can be off or on, secure transmission is not forcibly (e.g., automatically) on for a multicast service. In this case, the user plane security active state of the unicast DRB may be used as a baseline. When the user plane security active state of the unicast DRB is off, the determined user plane security active state of the multicast DRB is also in an off (e.g., inactive) state, to avoid transmission complexity caused by performing security protection on the multicast service.

In a possible implementation, the SMF device determines the first multicast security policy based on the second multicast security policy. For example, when the second multicast security policy is on, the first multicast security policy is on: or when the second multicast security policy is off, the first multicast security policy is off. In other words, the user plane security active state of the unicast DRB may not be considered, and the user plane security active state of the multicast DRB is determined by using the second multicast security policy as a baseline. In this way; the multicast service transmission security requirement can be better met.

In a possible implementation, when the user plane security active state of the DRB for transmitting the unicast service data is on or off, and the second multicast security policy is a required policy or a "not needed" policy, the SMF device determines the first multicast security policy based on the second multicast security policy.

In some embodiments, when the second multicast security policy is the required policy, it indicates that the user plane security state of the multicast DRB is on (e.g., active). In this case, regardless of whether the user plane security active state of the unicast DRB is on, the user plane security active state of the multicast DRB may be determined based on the second multicast security policy, to ensure the multicast service transmission security requirement. When the second multicast security policy is the "not needed" policy, it indicates that the user plane security active state of the multicast DRB is off (e.g., inactive). In this case, regardless of whether the user plane security active state of the unicast DRB is on, the user plane security active state of the multicast DRB may be determined based on the second multicast security policy, to meet the multicast service transmission security requirement, and avoid transmission complexity caused by performing security protection on the multicast service.

In a possible implementation, the first message further includes a PDU session identifier and/or a unicast security policy; and the unicast security policy is a required policy or a "not needed" policy, the required policy is used to indicate that a user plane security active state of the DRB for transmitting unicast service data is on, and the "not needed" policy indicates that the user plane security active state of the DRB for transmitting the unicast service data is off. The SMF delivers the PDU session identifier and/or the unicast security policy to the access device, so that the access device modifies the user plane security active state of the unicast DRB based on the user plane security active state of the multicast DRB, to meet a unicast service transmission security requirement. Certainly, in this application, it may be pre-specified in a protocol that the user plane security active state of the unicast DRB uses the user plane security active state of the multicast DRB as a baseline. In other words, the SMF device does not deliver the PDU session identifier and/or the unicast security policy to the access device, and the access device may also modify the user plane security active state of the unicast DRB based on the user plane security active state of the multicast DRB, that is indicated by the first multicast security policy.

In a possible implementation, when the user plane security active state of the DRB for transmitting the unicast service data is off or on, and the second multicast security policy is a required policy, the SMF device sends the first message to the access device through the AMF device. Optionally, the first message includes the PDU session identifier and/or the unicast security policy. When the second multicast security policy is required, it indicates that the user plane security active state of the multicast DRB is on. In this case, the user plane security active state of the multicast DRB is used as a baseline, and the determined user plane security active state of the unicast DRB is also on, so that the unicast service transmission security requirement can be ensured, and service transmission security is not degraded.

In a possible implementation, the second multicast security policy may be determined based on one or more of the following parameters, for example, a parameter such as a transmission mode, service information, subscription information, or a multicast service security mode.

When the multicast service security mode is a mode of performing security protection between a terminal and a core network or between a terminal and an application server, the SMF device determines that the second multicast security policy is not needed. In other words, the SMF device determines that security protection between the access device and the terminal is not needed, so that redundancy caused by repeatedly performing security protection can be avoided.

According to a fifth aspect, a communication method is provided. An access device receives, through an AMF device, a first message sent by an SMF device, where the first message includes a first multicast security policy in a PDU session, the first multicast security policy is a required policy or a "not needed" policy, the required policy indicates that a user plane security active state of a DRB for transmitting multicast service data is on, and the "not needed"

policy indicates that the user plane security active state of the DRB for transmitting the multicast service data is off; and the access device determines, based on the first multicast security policy, the user plane security active state of the DRB for transmitting the multicast service data, and configures a multicast PDCP layer entity.

The user plane security active state of the DRB for transmitting a multicast service data packet, that is indicated by the first multicast security policy may be the same as or different from a user plane security active state of a DRB, for transmitting a unicast service data packet in the PDU session. In conventional technologies, in a PDU session, a user plane security active state of a multicast DRB may use a user plane security active state of a unicast DRB as a baseline by default. However, in some embodiments, the SMF device indicates the first multicast security policy to the access device, and the access device may determine the user plane security active state of the multicast DRB based on the first multicast security policy. In comparison with a manner in which the user plane security active state of the unicast DRB is used as a baseline by default, this manner can more flexibly determine the user plane security active state of the multicast DRB, and is more applicable to a multicast service data transmission security requirement.

In a possible implementation, the first message further includes a PDU session identifier and/or a unicast security policy; and the unicast security policy is a required policy or a "not needed" policy, the required policy is used to indicate that the user plane security active state of the DRB for transmitting the unicast service data is on, and the "not needed" policy indicates that the user plane security active state of the DRB for transmitting the unicast service data is off.

In a possible implementation, the access device modifies, based on the unicast security policy and the PDU session identifier, the user plane security active state of the DRB for transmitting the unicast service data in the identified PDU session.

The SMF delivers the PDU session identifier and/or the unicast security policy to the access device so that the access device modifies the user plane security active state of the unicast DRB based on the user plane security active state of the multicast DRB to meet a unicast service transmission security requirement. Certainly, in this application, it may be pre-specified in a protocol that the user plane security active state of the unicast DRB uses the user plane security active state of the multicast DRB as a baseline. In other words, the SMF device does not deliver the PDU session identifier and/or the unicast security policy to the access device, and the access device may also modify the user plane security active state of the unicast DRB based on the user plane security active state, of the multicast DRB, that is indicated by the first multicast security policy.

In a possible implementation, the access device sends a first indication to a terminal, where the first indication is used to indicate the user plane security active state of the DRB, for transmitting the multicast service data, in the PDU session, and the user plane security active state includes whether integrity protection is activated and/or whether confidentiality protection is activated; and the access device configures the multicast PDCP layer entity based on the user plane security active state of the DRB for transmitting the multicast service data.

In a possible implementation, the access device sends one or more of the following indications to the terminal: a second indication, a third indication, and a fourth indication. The second indication is used to indicate the terminal to modify the user plane security active state of the DRB, for transmitting the unicast service data, in the PDU session to the user plane security active state of the DRB for transmitting the multicast service data, or the second indication is used to indicate a modified user plane security active state of the DRB, for transmitting the unicast service data, in the PDU session. The user plane security active state, of the DRB for transmitting the unicast service data, that is indicated by the second indication is usually the same as the user plane security active state of the DRB for transmitting the multicast service data. The third indication is an identifier of the DRB whose user plane security active state needs to be modified. The identifier of the DRB herein is an identifier of the unicast DRB. The fourth indication is used to indicate the terminal to modify the user plane security active state of the DRB, for transmitting the unicast service data in the PDU session, and the fourth indication may be used to explicitly indicate the terminal to modify the user plane security active state of the DRB for transmitting the unicast service data.

The access device delivers one or more of the second indication, the third indication, and the fourth indication to the terminal, so that the terminal modifies the user plane security active state of the unicast DRB based on the user plane security active state of the multicast DRB, to meet a unicast service transmission security requirement. Certainly, in this application, it may be pre-specified in a protocol that the user plane active state of the unicast DRB uses the user plane security active state of the multicast DRB as a baseline. In other words, the access device does not deliver one or more of the second indication, the third indication, and the fourth indication to the terminal, and the terminal may also modify the user plane security active state of the unicast DRB based on the user plane security active state, of the multicast DRB, that is indicated by the first indication.

According to a sixth aspect, a communication method is provided. When rejecting multicast service data transmission, the SMF device sends a first message to an access device through an AMF device or a UPF device, where the first message includes a first indication, and the first indication is used to indicate that the SMF device rejects the multicast service data transmission. The SMF device sends, to the AMF device or the UPF device, the first indication indicating that the SMF device rejects the multicast service data transmission, to notify the AMF device or the UPF device that the SMF device rejects the multicast service data transmission, so that the AMF device or the UPF device performs corresponding processing.

In a possible implementation, the first message further includes a second indication, and the second indication is used to indicate a reason why the SMF device rejects the multicast service data transmission. The SMF device not only notifies the AMF device or the UPF device that the SMF device rejects the multicast transmission, but also notifies the AMF device or the UPF device of the rejection reason, so that the corresponding device may perform corresponding processing. In some cases, the second indication and the first indication may alternatively be a same indication.

In a possible implementation, the reason for rejecting the multicast service data transmission includes a multicast service data transmission security requirement in the PDU session is inconsistent with a unicast service data transmission security requirement, or a multicast service transmission security requirement cannot be met.

In a possible implementation, the SMF device determines, based on a user plane security active state of a DRB, for transmitting unicast service data in the PDU session and a second multicast security policy, to reject the multicast service data transmission. The second multicast security policy herein may be, for example, a multicast security policy in a multicast context.

In a possible implementation, when the user plane security active state of the DRB for transmitting the unicast service data is on, and the second multicast security policy is a "not needed" policy, the SMF device determines to reject the multicast service data transmission, where the "not needed" policy is used to indicate that a user plane security active state of a DRB for transmitting multicast service data is off.

In a possible implementation, when the user plane security active state of the DRB for transmitting the unicast service data is off, and the second multicast security policy is a required policy, the SMF device determines to reject the multicast service data transmission, where the required policy is used to indicate that a user plane security active state of a DRB for transmitting multicast service data is on.

In two possible implementations, if the user plane security active state of the unicast DRB is inconsistent with the user plane security active state of the multicast DRB, that is indicated by the second multicast security policy, the multicast service transmission may be rejected.

According to a seventh aspect, a communication apparatus is provided. The apparatus has functions of implementing any one of the first aspect and the possible implementations of the first aspect, or has functions of implementing any one of the second aspect and the possible implementations of the second aspect, or has functions of implementing any one of the third aspect and the possible implementations of the third aspect, or has functions of implementing any one of the fourth aspect and the possible implementations of the fourth aspect, or has functions of implementing any one of the fifth aspect and the possible implementations of the fifth aspect, or has functions of implementing any one of the sixth aspect and the possible implementations of the sixth aspect. The functions may be implemented by hardware, or may be implemented by hardware executing corresponding software. The hardware or software includes one or more functional modules corresponding to the foregoing functions.

According to an eighth aspect, a computer program product is provided. The computer program product includes computer program code. When the computer program code is run on a computer, the computer is enabled to perform the method performed by the access device according to any one of the first aspect and the possible implementations of the first aspect, or perform the method performed by the terminal according to any one of the second aspect and the possible implementations of the second aspect, or perform the method performed by the access device according to any one of the third aspect and the possible implementations of the third aspect, or perform the method performed by the SMF device according to any one of the fourth aspect and the possible implementations of the fourth aspect, or perform the method performed by the access device according to any one of the fifth aspect and the possible implementations of the fifth aspect, or perform the method performed by the SMF device according to any one of the sixth aspect and the possible implementations of the sixth aspect.

According to a ninth aspect, this application provides a chip (which may be referred to as a chip system). The chip system includes a processor and a memory. The processor and the memory are electrically coupled. The memory is configured to store computer program instructions. The processor is configured to execute a part of or all of the computer program instructions in the memory. When the part of or all of the computer program instructions are executed, the processor is configured to implement functions of the access device in the method according to any one of the first aspect and the possible implementations of the first aspect, or implement functions of the terminal according to any one of the second aspect and the possible implementations of the second aspect, or implement functions of the access device according to any one of the third aspect and the possible implementations of the third aspect, or implement functions of the SMF device according to any one of the fourth aspect and the possible implementations of the fourth aspect, or implement functions of the access device according to any one of the fifth aspect and the possible implementations of the fifth aspect, or implement functions of the SMF device according to any one of the sixth aspect and the possible implementations of the sixth aspect.

In a possible design, the chip system may further include a transceiver. The transceiver is configured to send a signal processed by the processor, or receive a signal input to the processor. The chip system may include a chip, or may include a chip and another discrete component.

According to a tenth aspect, a computer storage medium is provided, and is configured to store a computer program. The computer program includes instructions for implementing functions according to any one of the first aspect and the possible implementations of the first aspect, or instructions for implementing functions according to any one of the second aspect and the possible implementations of the second aspect, or instructions for implementing functions according to any one of the third aspect and the possible implementations of the third aspect, or instructions for implementing functions according to any one of the fourth aspect and the possible implementations of the fourth aspect, or instructions for implementing functions according to any one of the fifth aspect and the possible implementations of the fifth aspect, or instructions for implementing functions according to any one of the sixth aspect and the possible implementations of the sixth aspect.

For technical effects of the seventh aspect to the tenth aspect, refer to descriptions in the first aspect to the sixth aspect. Details are not described again.

BRIEF DESCRIPTION OF DRAWINGS

FIG. 5A and FIG. 5B are a schematic diagram of a possible communication process according to an embodiment of this application;

FIG. 7A and FIG. 7B are a schematic diagram of a possible communication process according to an embodiment of this application:

DESCRIPTION OF EMBODIMENTS

Figures 1A, 1B:
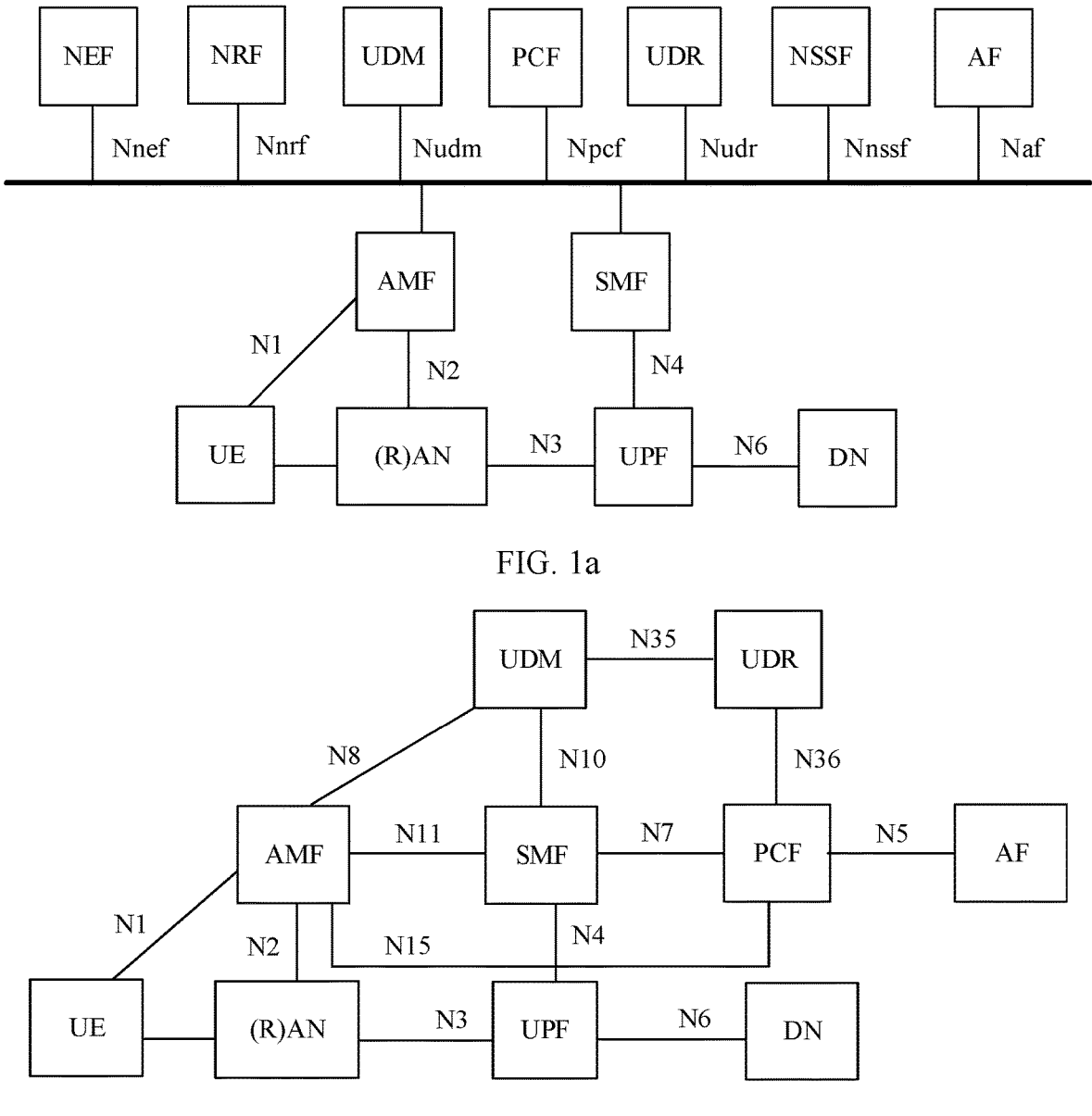
FIG. 1a is a schematic diagram of a possible communication system according to an embodiment of this application.
FIG. 1b is a schematic diagram of a possible communication system according to an embodiment of this application.

The following describes in detail embodiments of this application with reference to accompanying drawings.

In a current wireless network, there are a plurality of types of services, for example, a unicast service and a multicast service. For the unicast service, an access network device allocates/sets up, in a protocol data unit (PDU) session set up with a terminal device, a data radio bearer (DRB) for transmitting a data packet corresponding to the unicast service. One PDU session may include one or more DRBs for transmitting unicast service data, and user plane security policies of all DRBs for transmitting the unicast service data are the same as a user plane security policy in the PDU session. Different PDU sessions are set up between the access network device and different terminal devices, and the different PDU sessions include DRBs for transmitting unicast service data of different service data packets. To protect security for user plane data transmission between the terminal device and the access network device, different user plane security keys (including an encryption key and an integrity protection key) are generated between the access network device and the different terminal devices. The user plane security key is used to protect the user plane data transmission between the access network device and the terminal device. For example, if the access network device needs to send a data packet 1 of the unicast service to a terminal device 1, the access network device first determines a DRB 1, for transmitting the unicast service data, in a PDU session 1 for transmitting the data packet 1. Then, the access network device determines, based on a user plane security policy (where for example, encryption protection is on, and integrity protection is not on) corresponding to the PDU session 1, a user plane security active state of the DRB 1 for transmitting the unicast service data. When receiving from a core network the data packet 1 sent to the terminal device 1, the access network device performs encryption protection on the data packet 1 based on the user plane security active state of the DRB 1 for transmitting the unicast service data and sends an encrypted-protected data packet 1 to the terminal device 1. After receiving the encrypted-protected data packet 1, the terminal device 1 decrypts the data packet 1 based on the user plane security active state of the DRB 1 for transmitting the unicast service data, to obtain a plaintext data packet 1.

Currently, the multicast service may be transmitted in a unicast transmission mode or a multicast transmission mode. In the unicast transmission mode, the access network device may make a plurality of copies of a data packet received from a core network node based on a quantity of terminal devices that receive the multicast service. For example, if the access network device determines that three terminal devices need to receive the multicast service, the access network device may make three copies of the data packet received from the core network node: which are respectively a data packet 1, a data packet 2, and a data packet 3. The access network device separately sends the data packet 1, the data packet 2, and the data packet 3 to the three different terminal devices. In the multicast transmission mode, the access network device sends only one data packet, and a plurality of terminal devices need to support receiving and processing of the data packet.

A unicast service data packet corresponds to a type of data, namely, UE-specific data. A multicast service data packet corresponds to a type of data, namely, multicast service data. Different types of data may have different security requirements. For example, the multicast service may be an online live telecasting sports event with copyrighted information, and the multicast service data packet has an encryption security requirement: or the multicast service may be online live telecasting public news, and the multicast service data packet has no encryption security requirement. For another example, the unicast service may be a sports event with copyrighted information that is replayed by user equipment (UE), and the unicast service data packet has an encryption security requirement: or the unicast service may be public news on demand by UE, and the unicast service data packet has no encryption security requirement.

In an existing mechanism, after completing registration, the UE sets up a unicast transmission link between the UE and an application function (AF) through a PDU session setup procedure, to transmit a unicast service data packet between the UE and the AF. When a multicast service data packet needs to be transmitted between the UE and the AF, the UE initiates a multicast service join process. Currently, because an access device or the UE does not have a capability of using a multicast transmission mode, the multicast service data packet also needs to be sent to the UE in a unicast transmission bearer mode. In this case, data of two types of services, namely, unicast service data and multicast service data, needs to be transmitted in a same PDU session. In this scenario, how to ensure security requirements of both the unicast service data packet and the multicast service data packet is a problem that needs to be resolved.

In an implementation, in a PDU session setup process, a user plane security active state used by a set-up DRB for transmitting a unicast service data packet meets a security requirement of UE-specific data, the DRB is referred to as a first DRB, a DRB for transmitting a multicast service data packet also uses the user plane security active state of the first DRB, and the DRB for transmitting the multicast service data packet is referred to as a second DRB. In other words, in a PDU session, security active states of all DRBs are completely the same, namely, a security requirement at a PDU session granularity. However, in this implementation, because security requirements of different types of data are different, there is a risk of data leakage. For example, when the unicast service data packet does not need to be encrypted, the user plane security active state of the first DRB is confidentially off. However, when the multicast service data packet needs to be encrypted, the user plane security active state of the second DRB is confidentially on. If a unicast service data packet security requirement is met and encryption is not performed, the user plane security active state of the first DRB cannot meet a multicast service data packet security requirement.

Based on this, embodiments of this application provide manners of determining the user plane security active state of the DRB for transmitting the multicast service data packet, to meet the multicast service data packet security requirement. It can be ensured that when a radio access network transmits the multicast service data packet and the unicast service data packet on a unicast bearer, user plane security requirements of the multicast service and the unicast service are met, so that a user can correctly parse the data packets. Optionally, the user plane security active state of the DRB for transmitting the unicast service data packet may be further modified, to further meet the unicast service data packet security requirement.

For ease of understanding the technical solutions in embodiments of this application, the following briefly describes a system architecture of a communication method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions in embodiments of this application may be applied to various communication systems, for example, a wireless local area network (WLAN) communication system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system.

For example, the following describes an application scenario in embodiments of this application and a method in embodiments of this application by using a 5th generation communication system as an example.

In this application, a 5G communication system is used as an example for description.

For example, FIG. 1*a* is a schematic diagram of a 5G communication system architecture to which this application is applicable. FIG. 1*a* is a schematic diagram of a 5G network architecture based on a service-oriented architecture.

For example, FIG. 1*b* is a schematic diagram of another 5G communication system architecture to which this application is applicable. FIG. 1*b* is a schematic diagram of a point-to-point-based 5G architecture. A main difference between FIG. 1*a* and FIG. 1*b* lies in that interfaces between network elements in FIG. 1*a* are service-oriented interfaces, and interfaces between network elements in FIG. 1*b* are point-to-point interfaces.

The 5G network architectures shown in FIG. 1*a* and FIG. 1*b* may include a terminal device part, an access network part, and a core network part. Optionally, a data network (DN) and an AF network element part are further included. The terminal accesses the core network through the access network, and the core network communicates with the DN or the AF. The following briefly describes functions of some network elements.

The terminal device, which may also be referred to as UE, is a device that has a wireless transceiver function. The terminal device may be deployed on land, where the deployment includes indoor or outdoor, or handheld or vehicle-mounted deployment: may be deployed on water (for example, on a ship): or may be deployed in air (for example, on an airplane, a balloon, and a satellite). The terminal device may be a mobile phone, a tablet computer (e.g., tablet, pad), a computer having a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like.

A RAN device in this application is a device that provides a wireless communication function for the terminal device, and the RAN device is also referred to as an access network device. The RAN device in this application includes but is not limited to: a next generation base station (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit BBU), a transmission reception point (TRP), a transmission point (TP), a mobile switching center, or the like. In systems using different radio access technologies, names of a device that has a base station function may be different. For example, in a 5G system, the device is referred to as a RAN or a gNB (5G NodeB); in an LTE system, the device is referred to as an evolved NodeB (e.g., evolved NodeB, eNB, or eNodeB); in a 3rd generation (3G) system, the device is referred to as a NodeB; and so on.

The data network DN may have a plurality of services deployed, and may provide a terminal device with services such as a data service and/or a voice service. For example, the DN is a private network of a smart factory, a sensor installed in a workshop of the smart factory may be a terminal device, the sensor and a control server are deployed in the DN, and the control server may serve the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company.

An application network element mainly supports interaction with a 3rd generation partnership project (3GPP) core network to provide services, for example, affect a data routing decision and a policy control function, or provide some third-party services for a network side. In the 5G communication system, the application network element may be an AF network element. In a future communication system, the application network element may still be the AF network element, or may have another name. This is not limited in this application.

The core network part may include one or more of the following network elements.

An access management network element is a control plane network element provided by an operator network, and is responsible for access control and mobility management for accessing the operator network by the terminal device, for example, including functions such as mobility status management, allocation of a temporary user identity, and user authentication and authorization. In the 5G communication system, the access management network element may be an access and mobility management function (AMF) network element. In a future communication system, the access management network element may still be the AMF network element, or may have another name. This is not limited in this application.

A session management network element is mainly responsible for session management in a mobile network, for example, session setup, modification, and release. Specific functions may be allocating an internet protocol (IP) address to a user, selecting a user plane network element that provides a forwarding function, and the like. In the 5G communication system, the session management network element may be a session management function (SMF) network element. In a future communication system, the session management network element may still be the SMF network element, or may have another name. This is not limited in this application.

A user plane network element is responsible for forwarding and receiving user data in the terminal device. The user plane network element may receive the user data from the data network, and transmit the user data to the terminal device through the access network device. In addition, the user plane network element may alternatively receive the user data from the terminal device through the access network device, and forward the user data to the data network. A transmission resource and a scheduling function in the user plane network element that provide a service for the terminal device are managed and controlled by the SMF network element. In the 5G communication system, the user plane network element may be a user plane function (UPF) network element. In a future communication system, the user plane network element may still be the UPF network element, or may have another name. This is not limited in this application.

A data management network element is configured to generate an authentication credential, process a subscriber identifier (for example, store and manage a subscription permanent identifier), control access, manage subscription data, and so on. In the 5G communication system, the data management network element may be a unified data management (UDM) network element. In a future communication system, the unified data management network element may still be the UDM network element, or may have another name. This is not limited in this application.

A policy control network element mainly supports providing a unified policy framework to control network behavior and providing a policy rule for a control layer network function, and is responsible for obtaining user subscription information related to a policy decision. In a fourth generation (4G) communication system, the policy control network element may be a policy and charging rules function (PCRF) network element. In the 5G communication system, the policy control network element may be a policy control function (PCF) network element. In a future communication system, the policy control network element may still be the PCF network element, or may have another name. This is not limited in this application.

A network repository network element may be configured to provide a network element discovery function and provide, based on a request from another network element, network element information corresponding to a network element type. A network registration function (NRF) further provides a network element management service, for example, registration, update, and deregistration of a network element and subscription and push of a network element status. In the 5G communication system, the network repository network element may be a NRF network element. In a future communication system, the network repository network element may still be the NRF network element, or may have another name. This is not limited in this application.

A network exposure function network element may be configured to securely expose, to the outside, a service, a capability, and the like that are provided by a 3GPP network function device. In the 5G communication system, the network exposure function network element may be a network exposure function (NEF) network element. In a future communication system, the network exposure function network element may still be the NEF network element, or may have another name. This is not limited in this application.

A network slice selection network element may be used for selecting an appropriate network slice for a service of a terminal. In the 5G communication system, the network slice selection network element may be a network slice selection function (NSSF) network element. In a future communication system, the network exposure function network element may still be the NSSF network element, or may have another name. This is not limited in this application.

A network data analytics network element may collect data from each network function (NF), for example, the policy control network element, the session management network element, the user plane network element, the access management network element, and the application function network element (through a network capability exposure function network element), and perform analysis and prediction. In the 5G communication system, the network data analytics network element may be a network data analytics function (NWDAF). In a future communication system, the network exposure function network element may still be the NWDAF network element, or may have another name. This is not limited in this application.

A unified data repository network element is responsible for storing structured data information, including subscription information, policy information, and network data or service data defined in a standard format. In the 5G communication system, the unified data repository network element may be a unified data repository (UDR). In a future communication system, the network exposure function network element may still be the UDR network element, or may have another name. This is not limited in this application.

It may be understood that the network elements or the functions may be network elements in a hardware device, may be software functions running on dedicated hardware, or may be virtualized functions instantiated on a platform (for example, a cloud platform). In a possible implementation, the network elements or the functions may be implemented by one device, may be jointly implemented by a plurality of devices, or may be one functional module in one device. This is not limited in embodiments of this application.

For ease of understanding embodiments of this application, the following describes a part of terms in embodiments of this application, to help persons skilled in the art have a better understanding.

(1) PDU session: is an association between UE and a data network, and is used to provide a PDU connection service.

(2) DRB: defines processing of a data packet on an air interface. Different DRBs correspond to different data packet processing. One or more DRBs may be set up in one PDU session, to transmit services having different quality of service (QoS) requirements.

(3) Packet data convergence protocol (PDCP): is mainly used to process packet data of a bearer network layer on an air interface, for example, implement security functions (e.g., encryption and integrity protection). One DRB corresponds to one PDCP entity.

(4) Integrity protection ensures that information or data is not modified by an unauthorized device or can be quickly detected after being modified during transmission or storage of the information or data. In addition, it should be noted that an integrity-protected message in this application may further be confidentiality-protected, where being confidentiality-protected means that information cannot be accessed or disclosed by an unauthorized individual, entity, or procedure.

The following describes the solution in detail with reference to the accompanying drawings. Features or content denoted by dashed lines in the figure may be understood as optional operations or optional structures in embodiments of this application. It should be noted that in this application. "a user plane security active state of a DRB for transmitting a multicast service data packet" and "a user plane security active state of a DRB for transmitting multicast service data" have a same meaning. In addition, a "multicast DRB" in the following is a "DRB for transmitting a multicast service data packet". The following is merely for ease of description and understanding, and the "multicast DRB" should not constitute a limitation on the "DRB for transmitting the multicast service data packet". Similarly, a "unicast DRB" in the following is a "DRB for transmitting a unicast service data packet", and the "unicast DRB" should not constitute a limitation on the "DRB, for transmitting the unicast service data packet, in a PDU session".

Figure 2:
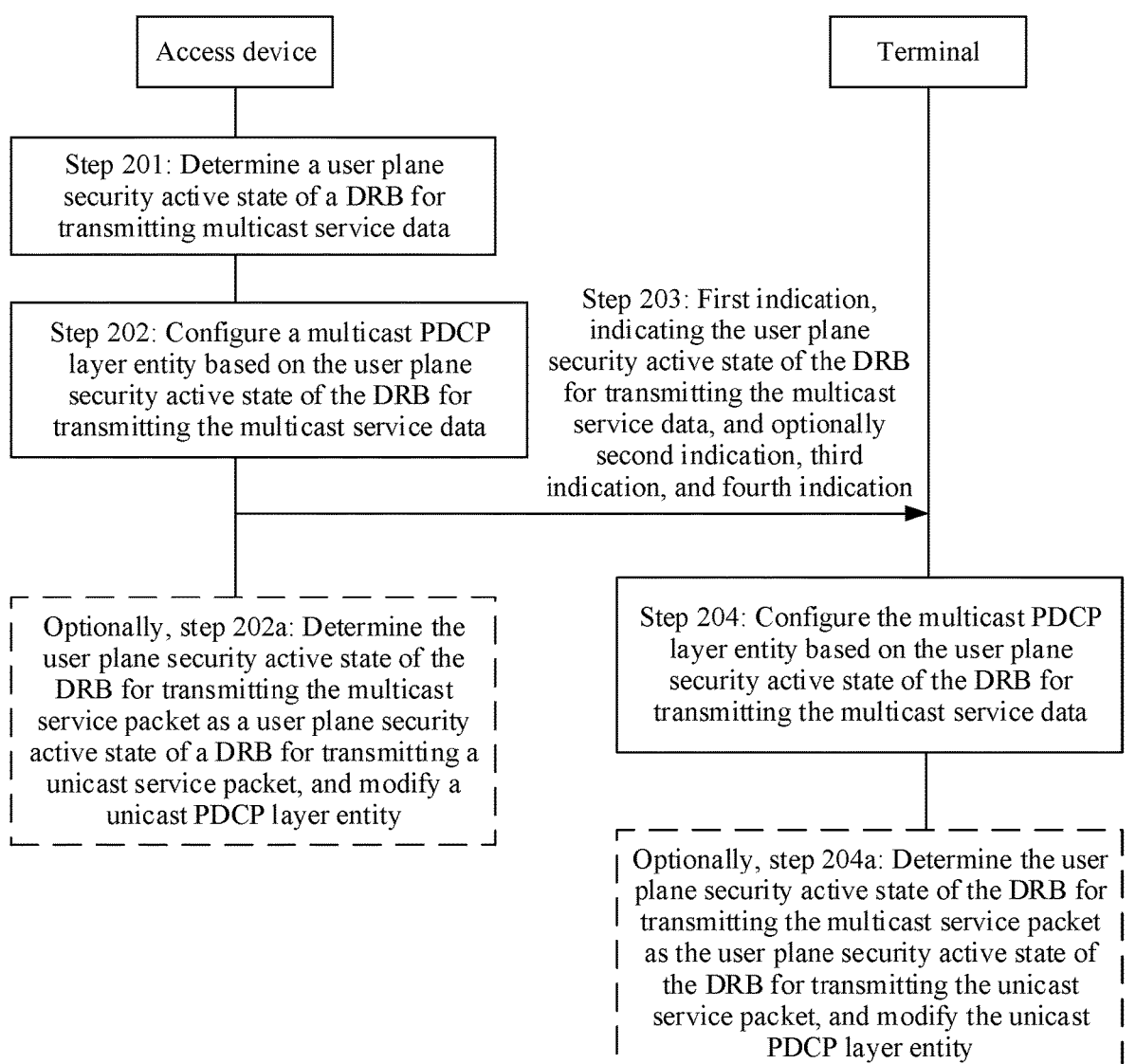
FIG. 2 is a schematic diagram of a possible communication process according to an embodiment of this application.

FIG. 2 is a schematic diagram of a possible communication process according to an embodiment of this application. The communication process includes the following steps.

Step 201: An access device determines a user plane security active state of a DRB for transmitting multicast service data.

In an example 1, the access device determines, based on a first parameter set, the user plane security active state of the DRB for transmitting a multicast service data packet, where the first parameter set includes but is not limited to one or both of the following parameters: a user plane security active state of a DRB, for transmitting unicast service data, in a PDU session, and a multicast security policy. The multicast security policy herein may be a multicast security policy in a multicast context, namely, a second multicast security policy described below; and is usually generated by an SMF device. An example process of the example is described in FIG. 3A and FIG. 3B. Herein, the user plane security active state of the DRB for transmitting the unicast service data may be determined based on a unicast security policy. The unicast security policy may be sent by the SMF device to the access device. The user plane security active state of the DRB for transmitting the unicast service data is usually determined in a process of setting up unicast service transmission. Herein, the user plane security active state of the DRB for transmitting the unicast service data may be stored in subscription information, may be stored in the SMF device, or may be obtained from a network element such as a PCF. Details are described in subsequent step 31 in FIG. 3A and FIG. 3B.

In an example 2, the access device determines, based on a first multicast security policy, the user plane security active state of the DRB for transmitting a multicast service data packet. Herein, the first multicast security policy may be sent to the access device after an SMF device determines the user plane security active state of the DRB for transmitting the multicast service data, and converts the state of the multicast DRB into the first multicast security policy, and the first multicast security policy is different from the second multicast security policy in the foregoing example 1. An example process of the example 2 is described in FIG. 5A and FIG. 5B.

In another example 3, the access device may obtain, from another device, the user plane security active state of the DRB for transmitting the multicast service data. For example, the access device receives the user plane security active state, of the DRB for transmitting the multicast service data, that is sent by an AMF device or an SMF device. An example process of the example is described in FIG. 7A and FIG. 7B.

In the example 2 and the example 3, the SMF device may determine, based on a second parameter set, the user plane security active state of the DRB for transmitting the multicast service data packet, where the second parameter set includes but is not limited to one or both of the following parameters: the user plane security active state of the DRB, for transmitting the unicast service data, in the PDU session, and a second multicast security policy.

In another example 4, the access device may determine, in a multicast service security mode, the user plane security active state of the DRB for transmitting a multicast service data packet. For example, when the multicast service security mode is a security protection mode between a terminal and a core network, the access device may determine that the user plane security active state of the DRB for transmitting the multicast service data is off, that is, determine that security protection between the access device and the terminal is not needed, so that redundancy caused by repeatedly performing security protection can be avoided. An example process of the example is described in FIG. 8.

The unicast security policy includes a required policy, a preferred policy, and a "not needed" policy. The required policy is used to indicate that the user plane security active state of the DRB for transmitting the unicast service data is on. The preferred policy is used to indicate that the user plane security active state of the DRB for transmitting the unicast service data may be on or off. The "not needed" policy is used to indicate that the user plane security active state of the DRB for transmitting the unicast service data is off.

The multicast security policy includes a required policy, a preferred policy, and a "not needed" policy. The required policy is used to indicate that the user plane security active state of the DRB for transmitting the multicast service data is on. The preferred policy is used to indicate that the user plane security active state of the DRB for transmitting the multicast service data may be on or off. The "not needed" policy is used to indicate that the user plane security active state of the DRB for transmitting the multicast service data is off.

Being "on" may be equivalent to that the user plane security active state is active, being "off" is that the user plane security active state is not on, and being off may be equivalent to that the user plane security active state is inactive.

Step 202: The access device configures a multicast PDCP layer entity based on the user plane security active state of the DRB for transmitting the multicast service data packet.

Step 203: The access device sends a first message to the terminal, and correspondingly the terminal receives the first message sent by the access device, where the first message includes a first indication, the first indication is used to indicate the user plane security active state of the DRB, for transmitting the multicast service data, in the PDU session, and the user plane security active state includes whether integrity protection is activated and/or whether confidentiality protection is activated.

A sequence of step 202 and step 203 is not limited. The access device may first send the first message to the terminal, and then configure the multicast PDCP layer entity based on the user plane security active state of the DRB for transmitting the multicast service data packet. Alternatively, the access device may first configure the multicast PDCP layer entity based on the user plane security active state of the DRB for transmitting the multicast service data packet, and then send the first message to the terminal. Alternatively, the two steps may be performed together.

Step 204: The terminal configures the multicast PDCP layer entity based on the user plane security active state of the DRB for transmitting the multicast service data.

In conventional technologies, in a PDU session, a user plane security active state is at a PDU session granularity: Usually, a user plane security active state of a multicast DRB may use a user plane security active state of a unicast DRB as a baseline by default. However, in some embodiments, the access device may indicate the user plane security active state of the multicast DRB to the terminal, and the terminal may determine the user plane security active state of the multicast DRB based on the first indication of the access device. In comparison with a manner in which the user plane security active state of the unicast DRB is used as a baseline by default, this indication manner can more flexibly determine the user plane security active state of the multicast DRB, and is more applicable to a multicast service data transmission security requirement.

Optionally, the access device may re-determine the user plane security active state of the unicast DRB.

In an example 1, the access device determines, based on a first parameter set, the user plane security active state of the DRB for transmitting a unicast service data packet, where the first parameter set includes but is not limited to one or both of the following parameters: the user plane security active state of the DRB, for transmitting unicast service data, in a PDU session, and a multicast security policy. An example process of the example is described in FIG. 3A and FIG. 3B.

In an example 2, the access device determines, based on a unicast security policy, the user plane security active state of the DRB for transmitting a unicast service data packet. Herein, the unicast security policy may be sent to the access device after an SMF device determines the user plane security active state of the DRB for transmitting unicast service data, and converts the state of the unicast DRB into the unicast security policy. An example process of the example is described in FIG. 5A and FIG. 5B.

In another example 3, the access device may obtain, from another device, the user plane security active state of the DRB for transmitting unicast service data. For example, the access device receives the user plane security active state, of the DRB for transmitting the unicast service data, that is sent by an AMF device or an SMF device. An example process of the example is described in FIG. 7A and FIG. 7B.

In the example 2 and the example 3, the SMF device may determine, based on a second parameter set, the user plane security active state of the DRB for transmitting the unicast service data packet, where the second parameter set includes but is not limited to one or both of the following parameters: the user plane security active state of the DRB, for transmitting the unicast service data, in the PDU session, and a second multicast security policy.

In this application, when the access device, the SMF device, or the another device determines, based on the user plane security active state of the DRB for transmitting the unicast service data and the second multicast security policy (the first parameter set or the second parameter set), the user plane security active state of the DRB for transmitting the multicast service data packet and the user plane security active state of the DRB for transmitting the unicast service data packet, the following three manners may be divided. In addition, in some cases, the access device, the SMF device, or the another device may alternatively reject multicast service data transmission.

In a manner 1 (unicast used as a baseline), the user plane security active state of the DRB for transmitting the unicast service data packet is used as a baseline.

When the manner 1 is performed, the user plane security active state of the DRB for transmitting the unicast service data may be determined as the user plane security active state of the DRB for transmitting the multicast service data. To be specific, when the user plane security active state of the unicast DRB is on, the user plane security active state of the multicast DRB is also on; or when the user plane security active state of the unicast DRB is off, the user plane security active state of the multicast DRB is also off.

In a manner 2 (multicast used as a baseline), the user plane security active state of the DRB for transmitting the multicast service data packet is used as a baseline. The user plane security active state of the DRB for transmitting the multicast service data packet is the same as the user plane security active state of the DRB for transmitting the unicast service data packet. This process is not only related to configuration of the user plane security active state of the DRB for transmitting the multicast service data packet, but also related to modification of the user plane security active state of the set-up DRB for transmitting the unicast service data packet.

When the manner 2 is performed, the user plane security active state of the DRB for transmitting the multicast service data may be determined based on the second multicast security policy. For example, when the second multicast security policy is a required policy, it is determined that the user plane security active state of the DRB for transmitting the multicast service data is on: or when the second multicast security policy is a "not needed" policy, it is determined that the user plane security active state of the DRB for transmitting the multicast service data is off. In addition, the user plane security active state of the DRB for transmitting the multicast service data is used as the user plane security active state of the DRB for transmitting the unicast service data, to modify the unicast DRB.

In a manner 3 (unicast and multicast are independent), the user plane security active state of the DRB for transmitting the multicast service data packet is not related to the user plane security active state of the DRB for transmitting the multicast service data packet. This process is not related to modification of the user plane security active state of the set-up DRB for transmitting the unicast service data packet. It may be understood that in a PDU session, a user plane security active state of a multicast DRB may be different from a user plane security active state of a unicast DRB. That is, user plane security protection at a DRB granularity is implemented.

When the manner 3 is performed, the user plane security active state of the DRB for transmitting the multicast service data may be determined based on the second multicast security policy.

In a manner 4, multicast service data transmission is rejected.

Refer to the following Table 1. A specific manner in the foregoing manner 1 to manner 4 is used in a specific scenario is described.

TABLE 1

| Scenario | Unicast security policy | User plane security active state of the DRB for transmitting the unicast service data packet | Multicast security policy | Recommended manner |
|---|---|---|---|---|
| 1 | Required | On (on) | Required/ Preferred (preferred) | Manner 1 |
| 2 | Required | On | Not needed | Manner 1 (security not degraded)/ Manner 3/ Manner 4 |
| 3 | Not needed | Off (off) | Not needed/ Preferred | Manner 1 |
| 4 | Not needed | Off | Required | Manner 2 (security not degraded)/ Manner 3/ Manner 4 |
| 5 | Preferred | On | Required/ Preferred | Manner 1 |
| 6 | Preferred | On | Not needed | Manner 1 (security not degraded)/ Manner 3/ Manner 4 |
| 7 | Preferred | Off | Not needed/ Preferred | Manner 1 |
| 8 | Preferred | Off | Required | Manner 2 (security not degraded)/ Manner 3/ Manner 4 |

For example, with reference to the scenarios 1, 2, 5, and 6, when the user plane security active state of the DRB for transmitting the unicast service data is on, the multicast security policy may be the required policy, the preferred policy, or the "not needed" policy, and the manner 1: unicast used as a baseline, is used.

When the user plane security active state of the unicast DRB is on, the integrity protection is activated and/or the confidentiality protection is activated. In this case, the user plane active state of the unicast DRB is used as a baseline, so that the determined user plane security active state of the multicast DRB is also in an active state, to ensure a multicast transmission security requirement.

For example, with reference to the scenarios 3 and 7, when the user plane security active state of the DRB for transmitting the unicast service data is off, and the multicast security policy is the preferred policy or the "not needed" policy, the manner 1: unicast used as a baseline, is used.

When the multicast security policy indicates that the user plane security active state can be off or on, secure transmission is not forcibly on for the multicast service. In this case, the user plane security active state of the unicast DRB is used as a baseline. When the user plane security active state of the unicast DRB is off, the determined user plane security active state of the multicast DRB is also in an off (inactive) state, to avoid transmission complexity caused by performing security protection on the multicast service.

For example, with reference to the scenarios 4 and 8, when the user plane security active state of the DRB for transmitting the unicast service data is off or on, and the multicast security policy is the required policy, the manner 2: multicast used as a baseline, is used.

When the multicast security policy is required, it indicates that the user plane security active state of the multicast DRB is on. In this case, the user plane security active state of the multicast DRB is used as a baseline, and the determined user plane security active state of the unicast DRB is also on, so that a unicast service transmission security requirement can be ensured, and service transmission security is not degraded.

For example, with reference to the scenarios 2, 4, 6, and 8, when the user plane security active state of the DRB for transmitting the unicast service data is on, and the multicast security policy is the "not needed" policy, the manner 3 is used: or when the user plane security active state of the DRB for transmitting the unicast service data is off, and the multicast security policy is the required policy, the manner 3 is used.

In other words, if the user plane security active state of the unicast DRB is inconsistent with the user plane security active state, of the multicast DRB, that is indicated by the multicast security policy, the unicast DRB and the multicast DRB may be independent of and decoupled from each other.

For example, when the user plane security active state of the DRB for transmitting the unicast service data is on, and the multicast security policy is the required policy, the manner 3 is used: or when the user plane security active state of the DRB for transmitting the unicast service data is off, and the multicast security policy is the "not needed" policy, the manner 3 is used. In other words, when transmission security requirements of the unicast DRB and the multicast DRB are consistent, the unicast DRB and the multicast DRB may be independent of and decoupled from each other, to meet respective service transmission security requirements.

For example, with reference to the scenarios 2, 4, 6, and 8, when the user plane security active state of the DRB for transmitting the unicast service data is on, and the multicast security policy is the "not needed" policy, the manner 4 is used: or when the user plane security active state of the DRB for transmitting the unicast service data is off, and the multicast security policy is the required policy, the manner 4 is used.

In other words, if the user plane security active state of the unicast DRB is inconsistent with the user plane security active state, of the multicast DRB, that is indicated by the multicast security policy, the multicast service transmission may be rejected.

For the manner 2, the user plane security active state of the DRB for transmitting the multicast service data packet is used as a baseline.

In an optional example, the first message in step 203 further includes one or more of the following indications: a second indication, a third indication, and a fourth indication.

The second indication is used to indicate the terminal to modify the user plane security active state of the DRB, for transmitting the unicast service data, in the PDU session to the user plane security active state of the DRB for transmitting the multicast service data, or the second indication is used to indicate a modified user plane security active state of the DRB, for transmitting the unicast service data, in the PDU session. The modified user plane security active state, of the DRB for transmitting the unicast service data, that is indicated by the second indication is usually the same as the user plane security active state of the DRB for transmitting the multicast service data. In this case, the second indication may be a separate IE, and is the same as the first indication of the user plane security active state of the multicast DRB. Certainly, the second indication may not be carried.

The third indication is an identifier of the DRB whose user plane security active state needs to be modified. The identifier of the DRB herein is an identifier of the unicast DRB. There may be one or more identifiers. If the third indication is not carried, user plane security active states of all unicast DRBs in the current PDU session may be modified.

The fourth indication is used to indicate the terminal to modify the user plane security active state of the DRB, for transmitting the unicast service data, in the PDU session, and the fourth indication may be used to explicitly indicate the terminal to modify the user plane security active state of the DRB for transmitting the unicast service data.

The access device delivers one or more of the second indication, the third indication, and the fourth indication to the terminal, so that the terminal modifies the unicast user plane security active state, to meet a unicast transmission security requirement.

In addition, the access device may further perform step 202a.

Step 202a: The access device determines the user plane security active state of the DRB for transmitting the multicast service data packet as the user plane security active state of the DRB for transmitting the unicast service data packet, and modifies a configured unicast PDCP layer entity.

Correspondingly, after receiving the first message, the terminal may further perform step 204a.

Step 204a: The terminal determines the user plane security active state of the DRB for transmitting the multicast service data packet as the user plane security active state of the DRB for transmitting the unicast service data packet, and modifies the configured unicast PDCP layer entity.

When the terminal receives the second indication, the terminal may modify, based on the user plane security active state of the DRB for transmitting the multicast service data or the modified user plane security active state of the DRB for transmitting the unicast service data, the user plane security active state of the DRB for transmitting the unicast service data.

When the terminal receives the third indication, the terminal may modify the user plane security active state of the identified DRB.

When the terminal receives the fourth indication, the terminal may modify the user plane security active state of the DRB for transmitting the unicast service data.

Certainly, in this application, it may be pre-specified in the protocol that the user plane active state of the unicast DRB uses the user plane security active state of the multicast DRB as a baseline. In other words, the access device does not deliver one or more of the second indication, the third indication, the fourth indication to the terminal, the access device also performs step 202a, and the terminal also performs step 204a.

Figure 3A:
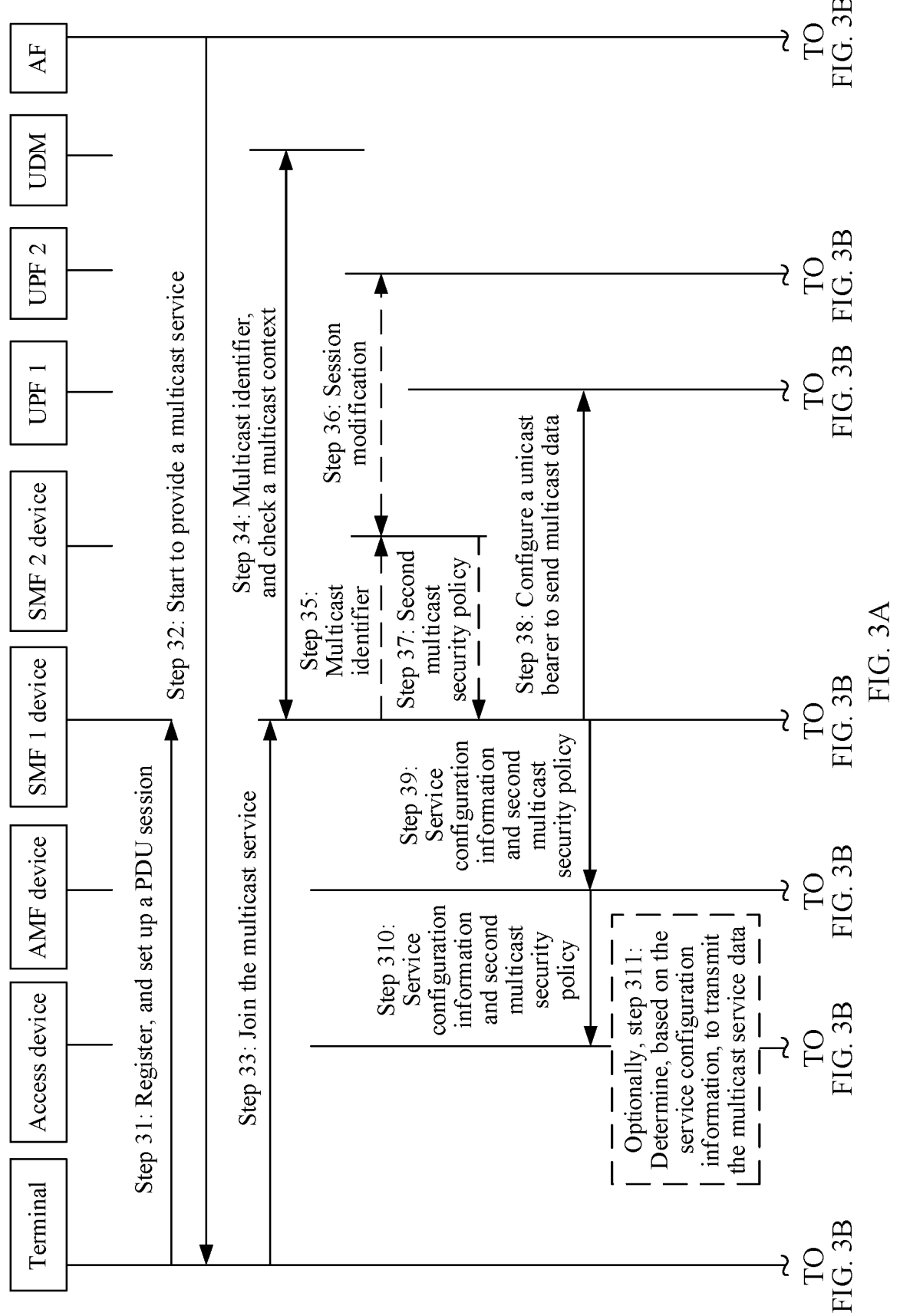
FIG. 3A and FIG. 3B are a schematic diagram of a possible communication process according to an embodiment of this application.
Figure 3B:
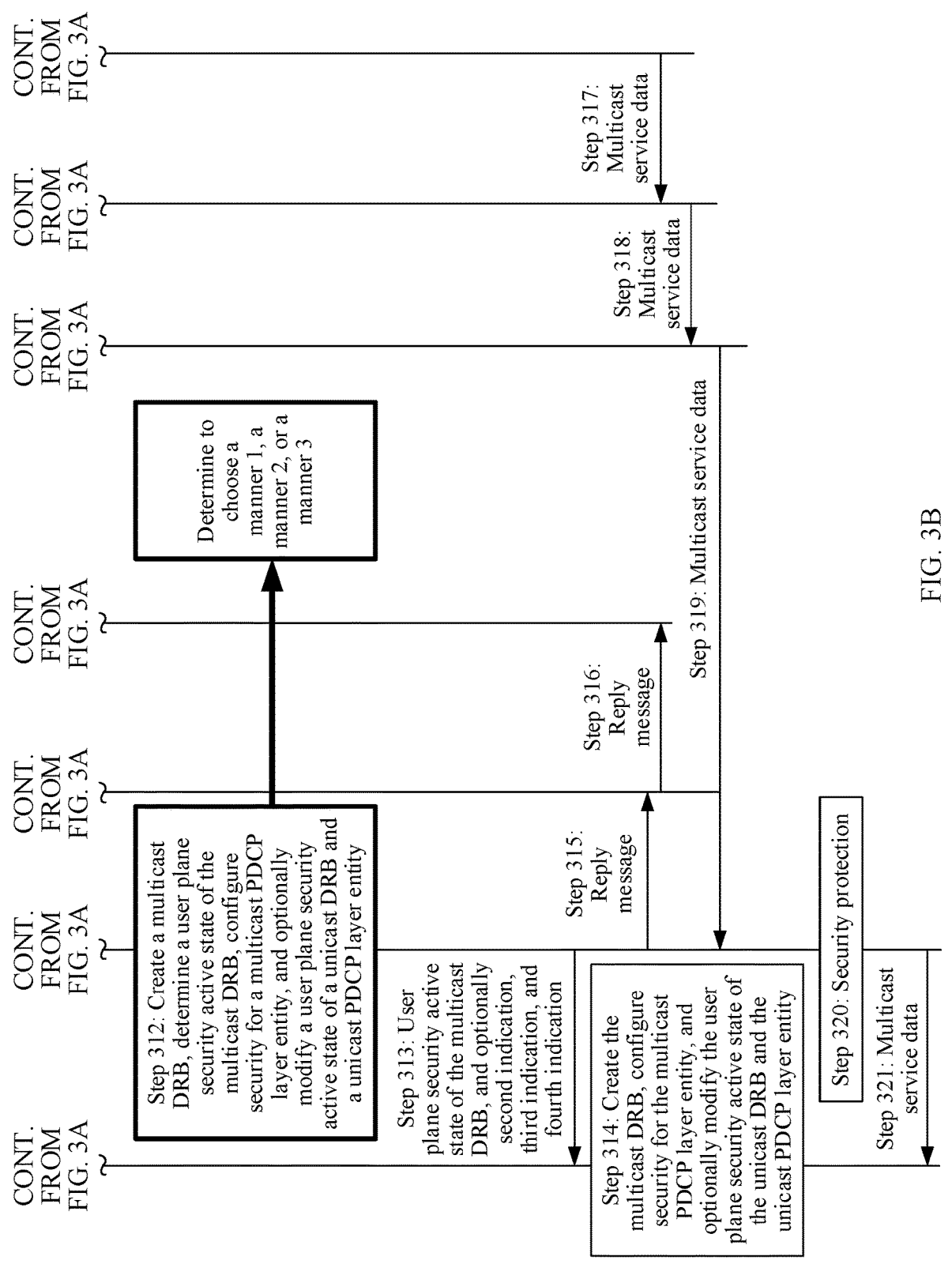

With reference to FIG. 3A and FIG. 3B, the following describes in detail the communication process in which the access device determines to use any one of the three manners: the manner 1 to the manner 3. In this example, the SMF device directly sends the second multicast security policy in the multicast context to the access device without modifying the second multicast security policy. In this case, the access device determines, with reference to the user plane security active state of the unicast DRB and the second multicast security policy, to use any one of the three manners: the manner 1 to the manner 3.

In FIG. 3A and FIG. 3B, an SMF currently serving UE is an SMF 1. The SMF 1 may be an anchor SMF. If the SMF 1 is not an anchor SMF, an SMF 2 is the anchor SMF. Similarly, a UPF currently processing a PDU session of the UE is a UPF 1. The UPF 1 may be an anchor UPF. If the UPF 1 is not an anchor UPF, a UPF 2 is the anchor UPF.

The SMF device in FIG. 2 is the SMF 1 device in FIG. 3A and FIG. 3B.

Step 31: The terminal performs registration, and sets up a PDU session.

The UE registers with a network, and sets up the PDU session with an AF. After the PDU session is set up, a unicast DRB is set up between the UE and the access device. In a PDU session setup process, the SMF 1 sends a unicast user plane security policy (where in this application, the user plane security policy is a security policy for short) to the access device. Correspondingly, the access device receives the unicast security policy sent by the SMF 1.

The access device determines a user plane security active state of the unicast DRB based on the unicast security policy, and configures a security protection method for the unicast DRB based on the determined user plane security active state of the unicast DRB, for example, configures a unicast PDCP layer entity.

The unicast security policy may be integrity protection: a required policy/preferred policy/"not needed" policy; and confidentiality protection: a required policy/preferred policy/"not needed" policy. The user plane security active state of the unicast DRB may be that the integrity protection is on/off; and that the confidentiality protection is on/off. The access device does not violate the unicast security policy when determining the user plane security active state of the unicast DRB.

When the unicast security policy is the required policy, the access device may determine that the user plane security active state of the unicast DRB is on. For example, when the integrity protection is required, the user plane security active state of the unicast DRB is that the integrity protection is on. When the confidentiality protection is required, the user plane security active state of the unicast DRB is that the confidentiality is on. When the security policy is required, the user plane security active state of the corresponding unicast DRB is on. This correspondence may be agreed upon by the access device and the SMF 1 in advance. In this case, the access device does not need to notify the SMF 1 of the user plane security state of the unicast DRB.

When the security policy is the "not needed" policy, the access device may determine that the user plane security active state of the unicast DRB is off. For example, when the integrity protection is not needed, the user plane security active state of the unicast DRB is that the integrity protection is off. When the confidentiality protection is not needed, the user plane security active state of the unicast DRB is that the confidentiality is off. When the security policy is not needed, the user plane security active state of the corresponding unicast DRB is off. This correspondence may be agreed upon by the access device and the SMF 1 in advance. In this case, the access device does not need to notify the SMF 1 of the user plane security state.

When the security policy is preferred (which indicates that the security policy may be active or may be inactive), optionally; the access device determines the user plane security active state of the unicast DRB. For example, the access device determines that the user plane security active state is that the integrity protection is on and the confidentiality protection is off. Alternatively, the access device determines that user plane security protection is that the integrity protection is off and the confidentiality protection is off. Alternatively, the access device determines that the user plane security active state is that the integrity protection is on and the confidentiality protection is on. Alternatively, the access device determines that user plane security protection is that the integrity protection is off and the confidentiality protection is on. Further, optionally; the access device may further send the determined user plane security active state of the unicast DRB to the SMF 1.

After the foregoing process, the SMF 1 may learn of the user plane security active state of the unicast DRB used by the access device.

In addition, the unicast security policy is at a PDU session granularity: To be specific, user plane security active states of a plurality of different unicast DRBs in one PDU session are the same.

Step 32: A service provider (for example, the AF) may notify, by using an upper layer (for example, an application layer) message (for example, a multicast announcement multicast service announcement message), the UE that the UE starts to provide a multicast service. The upper layer message includes at least a multicast identifier. For example, the multicast identifier is a multicast IP address for providing the multicast service.

Step 33: After receiving the upper layer message, the UE may join the multicast service.

In an example, the UE may join the multicast service in a user plane manner. The UE may send a multicast join message to the UPF 1, where the multicast join message is a user plane message, and the multicast join message includes the multicast identifier. The UPF 1 may serve as a multicast router. After receiving the multicast join message from the UE, the UPF 1 may send a user plane event announcement message to the SMF 1. The user plane event announcement message is a signaling plane message, and the user plane event announcement message carries the multicast identifier. For example, the multicast identifier is a multicast IP address.

In another example, the UE may join the multicast service in a signaling plane manner. The UE may send a PDU session modification request message to an AMF, where the PDU session modification request message includes the multicast identifier. After receiving the PDU session modification request message from the UE, the AMF may send a message to the SMF 1. The message includes the multicast identifier. For example, the multicast identifier is a multicast IP address.

The UE may join the multicast service in either of the foregoing two manners, or may join the multicast service in another manner.

Step 34: After receiving the multicast identifier, the SMF 1 may perform a multicast transmission session check on a UDM, that is, check whether a multicast context (for example, QoS information) corresponding to the multicast identifier exists in the UDM. The SMF 1 sends the multicast identifier to the UDM. For example, the multicast identifier is the multicast IP address. After receiving the multicast identifier from the SMF 1, the UDM may check whether the multicast context corresponding to the multicast identifier exists in the UDM.

If the multicast context exists, the UDM may send the multicast context corresponding to the multicast identifier to the SMF 1, where the multicast context includes a second multicast security policy: Optionally, the multicast context further includes information about the anchor SMF, that is, the anchor SMF is the SMF 2, and routing information corresponding to the anchor SMF, that is, how to find the anchor SMF. The second multicast security policy stored in the UDM is stored in the UDM after being determined by the SMF 2.

If the multicast context does not exist, the SMF 1 is the anchor SMF, and the UDM may indicate the SMF 1 to create the multicast context, where the multicast context includes a second multicast security policy. In this case, the SMF 1 may determine the multicast context, and store the multicast context in the UDM, that is, store the second multicast security policy in the UDM, for invocation by another device.

For example, the SMF 1 or the SMF 2 may determine the second multicast security policy based on a parameter, for example, a transmission mode, service information, subscription information, or a multicast service security mode. The second multicast security policy may be that integrity protection is required/preferred/not needed, and that confidentiality protection is required/preferred/not needed.

The transmission mode is multicast transmission or broadcast transmission. The multicast service security mode may be a mode 1 in which security protection is performed between the UE and the access device (that is, security protection is performed between the terminal and the access device): or may be a mode 2 in which security protection is performed between the UE and a core network or between the terminal and an application server (that is, security protection is performed between the terminal and the core network/application server), where the core network element herein may be a multicast/broadcast service user plane network element (MBSU), a user plane gateway (UPF/UPGW), or the like: or may be a mode 3: in which security protection is separately performed between the UE and the access device, and between an access network device and a core network/an application server.

For example, when the transmission mode is the broadcast transmission, it may be determined that the second multicast security policy is the "not needed" policy. When the transmission mode is the multicast transmission, the SMF 1 may determine the second multicast security policy based on the service information, the subscription information, or the multicast service security mode. When the multicast service security mode is the mode 2, it may be determined that the second multicast security policy is the "not needed" policy. In this way, this can avoid security protection redundancy caused by performing security protection on the terminal and a base station on the basis that security protection has been performed between the terminal and the core network. When the multicast service security mode is the mode 1 or the mode 3, the SMF 1 may determine the second multicast security policy based on the service information or the subscription information. For example, the subscription information includes indication information to indicate the second multicast security policy.

If the SMF 1 is not the anchor SMF, and the SMF 2 is the anchor SMF, the SMF 2 maintains the multicast context, and the multicast context includes the second multicast security policy and the like. The SMF 1 may perform step 35 to step 37, to request the second multicast security policy from the SMF 2.

If the SMF 1 is the anchor SMF, the SMF 1 creates the multicast context, where the multicast context includes the second multicast security policy. In this case, step 35 to step 37 may be skipped, and step 38 is directly performed. That is, step 35 to step 37 are optional.

Step 35: The SMF 1 configures the SMF 2 to transmit multicast service data through a unicast transmission bearer. For example, the SMF 1 sends a multicast session transmission request message to the SMF 2 (anchor SMF), to request to set up a multicast service data user plane. The multicast session transmission request message carries the multicast identifier. For example, the multicast identifier is the multicast IP address.

Step 36: After the SMF 2 receives the multicast session transmission request message sent by the SMF 1, the SMF 2 may perform N4 session modification on the UPF 2, that is, configure the UPF 2 to send the multicast service data to the UPF 1. For example, the SMF 2 sends an N4 session modification request message to the UPF 2, where the N4 session modification request message includes routing information of the UPF 1.

Step 37: The SMF 2 sends a multicast session transmission response message to the SMF 1, where the multicast session transmission response message includes the second multicast security policy. Correspondingly, the SMF 1 receives the second multicast security policy from the SMF 2.

Step 38: The SMF 1 determines whether the user plane security active state of the current unicast DRB meets a requirement of the second multicast security policy. If the state meets the requirement, the SMF 1 may configure the UPF 1 to send the multicast service data through the unicast transmission bearer. For example, the SMF 1 sends the N4 session modification request message to the UPF 1.

If the state does not meet the requirement, the SMF 1 may reject multicast service data transmission. A specific process after the SMF 1 rejects the multicast service data transmission is the same as a specific process after the SMF 1 device determines to use the manner 4: rejecting the multicast service data transmission in FIG. 6. In addition, step 39 and subsequent steps are not performed.

When rejecting the multicast service data transmission, the SMF 1 may notify the access device and the UE of indication information indicating that the multicast service data transmission is rejected.

For example, in step 33, if the UE joins the multicast service in the user plane manner, the SMF 1 may notify, through the UPF 1, the access device and the UE that the multicast service data transmission is rejected. For example, the SMF 1 sends a user plane event announcement response message to the UPF 1, where the message is a signaling plane message, and the message carries an indication and/or a rejection cause value for rejecting the multicast service data transmission. Then, the UPF 1 sends the indication and/or the rejection cause value for the multicast service data transmission to the access device.

For example, in step 33, if the UE joins the multicast service in the signaling plane manner, the SMF 1 may notify, through the AMF, the access device and the UE that the multicast service data transmission is rejected. For example, the SMF 1 sends a message to the AMF, where the message includes an indication and/or a rejection cause value for rejecting the multicast service data transmission. Then, the AMF sends, to the access device, the indication and/or the rejection cause value for rejecting the multicast service data transmission.

A condition for determining that the user plane security active state of the unicast DRB does not meet the requirement of the second multicast security policy may include but is not limited to one of the following conditions: the user plane security active state of the unicast DRB is on, and the second multicast user plane security policy is not needed: or the user plane security active state of the unicast DRB is off, and the second multicast user plane security policy is required.

In step 38, the process in which the SMF 1 determines whether the user plane security active state of the current unicast DRB meets the requirement of the second multicast security policy is optional. The SMF 1 may alternatively skip the determining process, and continue to perform the following operations: The SMF 1 configures the UPF 1 to send the multicast service data through the unicast transmission bearer.

Step 39: The SMF 1 sends a configuration message to the AMF, where the configuration information includes service configuration information and the second multicast security policy. As described in step 34 to step 37, if the SMF 1 is the anchor SMF, the second multicast security policy is included in the multicast security context created by the SMF 1. If the SMF 1 is not the anchor SMF and the SMF 2 is the anchor SMF, the second multicast security policy is obtained by the SMF 1 from the SMF 2.

Step 310: After receiving the service configuration information and the second multicast security policy from the SMF 1, the AMF may send an N2 session modification request message to the access device, where the session modification request message carries the service configuration information and the second multicast security policy in step 39. Correspondingly, the access device receives the service configuration information and the second multicast security policy from the AMF.

Step 311: The access device determines, based on common information in the service configuration information, that the service is used to transmit the multicast service data. Herein, it is determined whether the condition is met between the access device and the UPF. The common information may include but is not limited to one or more of the following: (1) a service identifier, such as a temporary mobile group identity (TMGI), a multicast group identifier group ID, and an IP multicast address of the service; (2) transmit multicast group address information, which is used by the access device to join the multicast to receive the service; and (3) tunnel information of a common channel (which is for a scenario in which the common channel has been set up).

For example, if the service corresponding to the service configuration information belongs to a service that can be jointly received by a plurality of UEs, the service may be used to transmit the multicast service data.

If the service may be used to transmit the multicast service data, the access device associates the service with a common data channel based on the common information. The common data channel is a common data channel between the UPF 1 and the access device. The common data channel serves the UE that receives the service.

The common data channel may be previously set up, or may be triggered to be set up in this case. The common data channel may be set up in an existing setup manner, and details are not described herein again.

A case in which the service is not used to transmit the multicast service data is not concerned in this application. In this case, step 311 is optional, and may not be performed, and step 312 is directly performed. Correspondingly, the service configuration information in step 39 and step 310 is also optional.

Step 312: The access device chooses to perform any one of the foregoing manners, where the manner 1 is that unicast is used as a baseline, the manner 2 is that multicast is used as a baseline, and the manner 3 is that unicast and multicast are mutually independent.

The access device creates a multicast DRB, determines a user plane security active state of the multicast DRB, and configures security for a multicast PDCP layer entity, to transmit the multicast service data. When determining the user plane security active state of the multicast DRB, the access device may determine the user plane security active state of the multicast DRB based on parameters such as the user plane security active state of the unicast DRB and the second multicast security policy (the parameter in the first parameter set described in step 201).

Optionally, if the access device selects the manner 2, the access device may further modify the user plane security active state of the unicast DRB based on the user plane security active state of the multicast DRB, and modify the configured PDCP layer entity of the unicast DRB.

A process of configuring security for the multicast PDCP layer entity may include a process of associating a key and an algorithm with the multicast PDCP entity. For an example process, refer to an existing manner. Details are not described again. The key and the algorithm associated with the multicast PDCP layer entity may be the same as or different from a key and an algorithm associated with a unicast PDCP layer entity. Subsequently, the access network device may perform user plane security protection on the multicast service data packet based on the configuration of security for the multicast PDCP entity, and the terminal device performs user plane security de-protection on the multicast service data packet based on the configuration of security for the multicast PDCP entity; to implement user plane security protection on the multicast service.

A sequence of step 312 and step 313 may not be limited.

Step 313: When any one of the manner 1 to the manner 3 is performed, the access device may further send first indication to the terminal, where the first indication may be used to indicate the user plane security active state of the multicast DRB in the PDU session. Correspondingly, the UE receives the first indication from the access device. For example, the access device sends the first indication by using radio resource control (RRC) reconfiguration information. The RRC reconfiguration message herein may correspond to the first message in step 203 in FIG. 2, and the first indication may correspond to the first indication in step 203 in FIG. 2.

The access device selects the execution manner 2: multicast used as a baseline, which may be specified in a protocol that the user plane security active state of the DRB for transmitting the unicast service data packet uses the user plane security active state of the DRB for transmitting the multicast service data packet as a baseline, or may be that the access device sends indication information to the terminal, to indicate the terminal to modify the user plane security active state of the unicast DRB based on the user plane security active state of the multicast DRB. For details, refer to the second indication, the third indication, and the fourth indication in the first message in step 203 in FIG. 2. Details are not described herein again.

Step 314: When the UE receives the user plane security active state that is used to indicate the multicast DRB and that is indicated by the first indication from the access device, the terminal cooperates with the access device to create the multicast DRB, and the UE may configure security for the multicast PDCP layer entity based on the first indication, to transmit the multicast service data.

Optionally, if the UE may further receive one or more of the second indication, the third indication, and the fourth indication, operations performed by the UE after the UE receives these pieces of indication information are described in the foregoing process, and details are not described herein again. Alternatively, it is specified in a protocol that multicast is used as a baseline.

Even if the access device does not send one or more pieces of indication information of the second indication, the third indication, and the fourth indication to the terminal, to indicate the terminal to modify the user plane security active state of the unicast DRB based on the user plane security active state of the multicast DRB, the terminal modifies the user plane security active state of the unicast DRB, and modifies the configured unicast PDCP layer entity.

The process of configuring security for the multicast PDCP entity, whether by the access device or the UE, may include the process of associating the key and the algorithm with the multicast PDCP entity.

Step 315: The access device sends an N2 session modification reply message to the AMF, for example, a reply message for the N2 session modification request message in step 310.

Step 316: The AMF sends a reply message to the SMF 1, for example, a reply message for the configuration message in step 39.

Step 317: The multicast service data is sent from the AF to the UPF 2.

Step 318: The multicast service data is sent from the UPF 2 to the UPF 1.

Step 319: The multicast service data is sent from the UPF 1 to the access device.

Step 320): The access device selects a unicast bearer, and may perform user plane security protection on the multicast service data based on the configuration of security for the multicast PDCP entity.

Step 321: The multicast service data is sent from the access device to the UE.

In conclusion, FIG. 3A and FIG. 3B describes the communication process in which the access device determines, with reference to the user plane security active state of the unicast DRB and the second multicast security policy; to use any one of the manner 1 to the manner 3.

Figure 4:
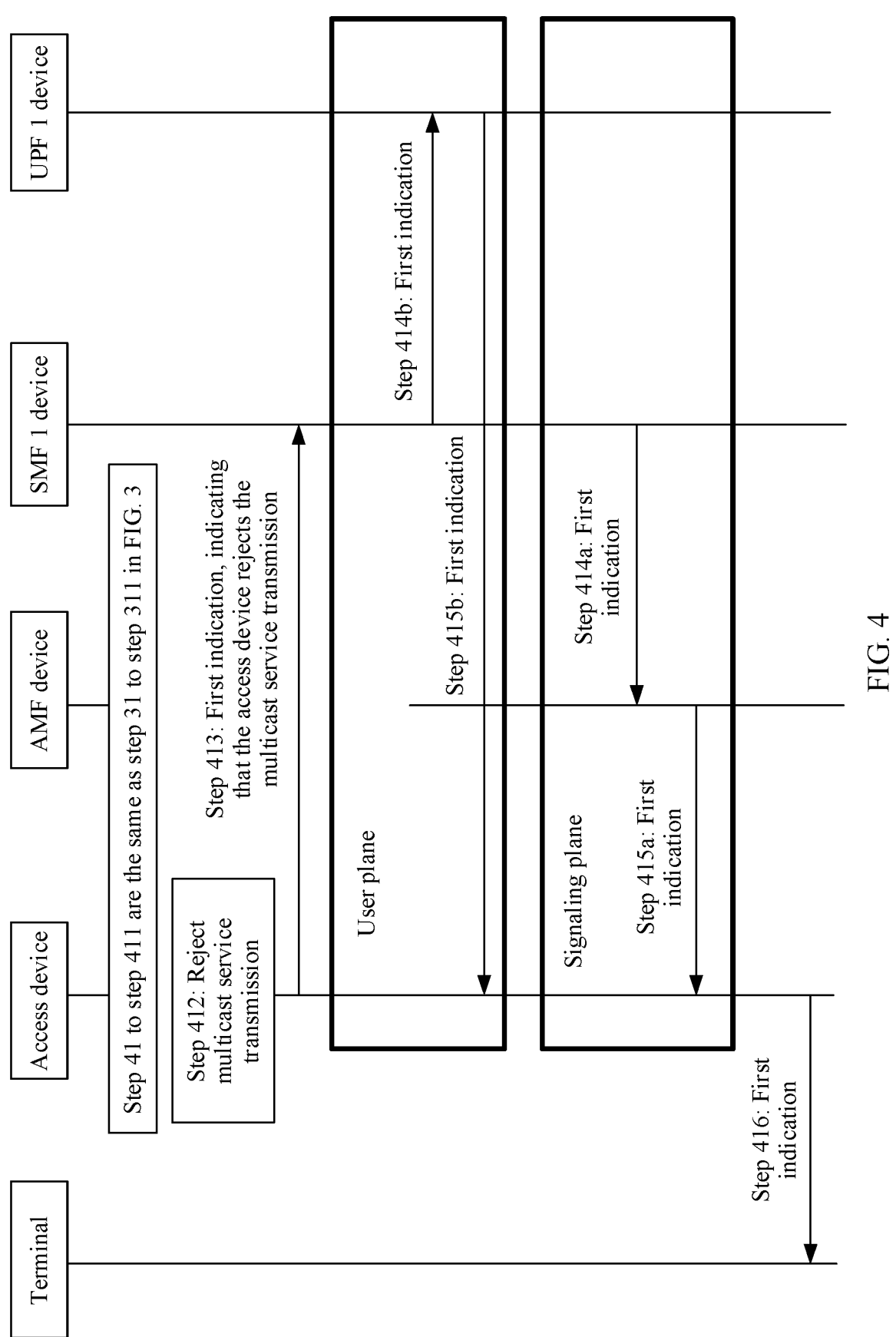
FIG. 4 is a schematic diagram of a possible communication process according to an embodiment of this application.

Next, FIG. 4 is a schematic diagram of a communication process in which an access device determines, with reference to a user plane security active state of a unicast DRB and a second multicast security policy, to use the manner 4: rejecting multicast service transmission. A first message, a first indication, and a second indication in this example are irrelevant to the first message, the first indication, and the second indication in the foregoing examples in FIG. 2 and FIG. 3A and FIG. 3B.

Step 41 to step 411 are the same as step 31 to step 311 in FIG. 3A and FIG. 3B, and repeated descriptions are not provided again.

Step 412: The access device selects the execution manner 4: rejecting multicast service data transmission.

The access device may determine, based on the user plane security active state of the DRB, for transmitting unicast service data, in a PDU session and the second multicast security policy, to reject the multicast service data transmission. Usually, if the user plane security active state of the unicast DRB is inconsistent with a user plane security active state, of a multicast DRB, that is indicated by the second multicast security policy; the multicast service transmission may be rejected.

In an example, when the user plane security active state of the DRB for transmitting the unicast service data is on, and the second multicast security policy is a "not needed" policy, the access device determines to reject the multicast service data transmission, where the "not needed" policy is used to indicate that the user plane security active state of the DRB for transmitting multicast service data is off.

In another example, when the user plane security active state of the DRB for transmitting the unicast service data is off, and the second multicast security policy is a required policy, the access device determines to reject the multicast service data transmission, where the required policy is used to indicate that the user plane security active state of the DRB for transmitting multicast service data is on.

Step 413: The access device sends the first message to an SMF device, where the first message includes the first indication, and the first indication is used to indicate that the access device rejects the multicast service data transmission.

Optionally, the first message further includes the second indication, and the second indication is used to indicate a reason why the access device rejects the multicast service data transmission. The access device not only notifies the SMF device that the access device rejects the multicast transmission, but also notifies the SMF device of the rejection reason, so that the SMF device may perform corresponding processing. In some cases, the second indication and the first indication may alternatively be a same indication.

For example, the reason for rejecting the multicast service data transmission includes: A multicast service data transmission security requirement in the PDU session is inconsistent with a unicast service data transmission security requirement, or a multicast service transmission security requirement cannot be met.

In step 43, if a terminal joins a multicast service through a signaling plane, step 414a is performed: after receiving the first message from the access device, the SMF device may send, to an AMF device, the first indication indicating that the access device rejects the multicast service data transmission, to notify the AMF device that the access device rejects the multicast service data transmission, to perform corresponding processing.

Step 415a: When receiving the first indication indicating that the access device rejects the multicast service data transmission, the AMF device may further notify the access device of the first indication.

In step 43, if a terminal joins a multicast service through a signaling plane, step 414b is performed: After receiving the first message from the access device, the SMF device may send, to a UPF 1 device, the first indication indicating that the access device rejects the multicast service data transmission, to notify the UPF device that the access device rejects the multicast service data transmission, to perform corresponding processing.

Step 415b: When receiving the first indication indicating that the access device rejects the multicast service data transmission, the UPF 1 device may further notify the access device of the first indication.

Step 416: After receiving the first indication from the AMF or the UPF 1, the access device may notify the terminal of the first indication indicating that the multicast service data transmission is rejected.

Optionally, the second indication may be carried in step 413, step 414a, step 414b, step 415a, step 415b, and step 416. The second indication is used to indicate the reason why the access device rejects the multicast service data transmission.

In conclusion, the communication process in which the access device determines, with reference to the user plane security active state of the unicast DRB and the second multicast security policy, to use the manner 4 is described.

Figure 5A:
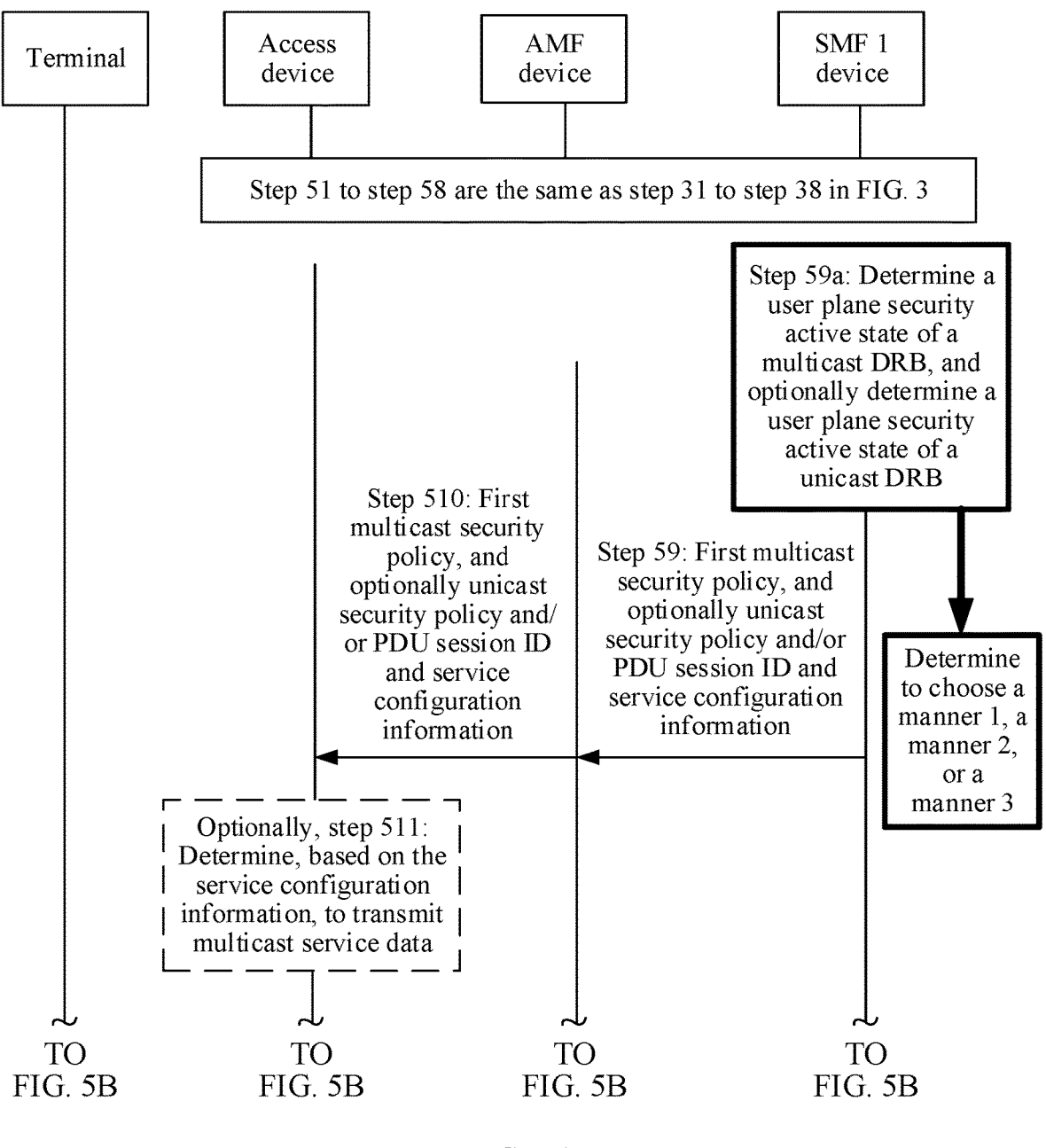

Next, refer to FIG. 5A and FIG. 5B. A communication process in which an SMF device determines, with reference to a user plane security active state of a unicast DRB and a second multicast security policy; to use any one of the manner 1 to the manner 3 is provided.

Step 51 to step 58 are the same as step 31 to step 38 in FIG. 3A and FIG. 3B, and repeated descriptions are not provided again. After step 58, an SMF 1 obtains the second multicast security policy.

Step 59a: The SMF 1 determines, based on the user plane security active state of the unicast DRB and the second multicast security policy (the parameter in the second parameter set described in step 201), to use the manner 1, the manner 2, or the manner 3. In other words, a user plane security active state of a multicast DRB is determined, and optionally the user plane security active state of the unicast DRB may be further determined. For the process, refer to Table 1 and corresponding descriptions above. Details are not described herein again. Herein, the user plane security active state of the DRB for transmitting unicast service data may be stored in subscription information, or may be locally stored in the SMF 1 device, or may be obtained from a network element such as a PCF.

Step 59: The SMF 1 sends a first multicast security policy to an AMF, and optionally further sends service configuration information.

It should be noted that the first multicast security policy herein is different from the second multicast security policy obtained before step 57, and the second multicast security policy obtained before step 57 includes a required policy, a preferred policy, and a "not needed" policy. It has been described in step 31 in FIG. 3A and FIG. 3B that when the SMF 1 delivers the preferred policy to the access device, the access device determines the user plane security active state of the unicast DRB. Similarly, if the first multicast security policy delivered by the SMF 1 to the access device is the preferred policy, the access device determines the user plane security active state of the multicast DRB. In this example, it is mainly concerned that the SMF1 device determines the user plane security active state of the multicast DRB. Therefore, the first multicast security policy in step 59 may not include the preferred state. When the user plane security active state, of the multicast DRB, that is determined in step 59a is on, the first multicast security policy in step 59 is the required policy. When the user plane security active state, of the multicast DRB, that is determined in step 59a is off, the first multicast security policy in step 59 is the "not needed" policy.

Optionally, if the SMF 1 selects the execution manner 2: multicast used as a baseline, when the user plane security active state of the unicast DRB needs to be modified, a unicast security policy and/or a PDU session ID may be further sent in step 59, so that the access device modifies the user plane security active state of the unicast DRB based on the unicast security policy. The PDU session ID corresponds to one or more DRB IDs. The access device is aware of the DRB, while the SMF is unaware of the DRB. Therefore, SMF 1 delivers the PDU session ID. If the SMF 1 selects execution manner 1: unicast used as a baseline, or selects execution manner 3: unicast and multicast are independent, the SMF 1 may not modify the user plane security active state of the unicast DRB, and may not carry the unicast security policy and the PDU session ID.

Certainly, it may alternatively be specified in a protocol that multicast is used as a baseline. In this way, the unicast security policy and/or the PDU session ID do/does not need to be sent, and the access device also modifies the user plane security active state of the unicast DRB based on the user plane security active state of the multicast DRB.

The unicast security policy in step 59 may not include the preferred state. When the user plane security active state, of the unicast DRB, that is determined in step 59a is on, the unicast security policy in step 59 is the required policy. When the user plane security active state, of the unicast DRB, that is determined in step 59a is off, the unicast security policy in step 59 is the "not needed" policy. In step 59, the first multicast security policy is usually the same as the unicast security policy. To be specific, when the first multicast security policy is the required policy, the unicast security policy is also the required policy: or when the first multicast security policy is the "not needed" policy, the unicast security policy is also the "not needed" policy. In this way, multicast used as a baseline can be ensured.

Step 510: After receiving the first multicast security policy from the SMF 1, the AMF may send a message to the access device, where the message carries the first multicast security policy in step 59, and optionally further carries the unicast security policy and/or the PDU session ID. The message may be, for example, an N2 session modification request message.

Correspondingly, the access device receives the service configuration information and the first multicast security policy from the AMF, and optionally may further receive the unicast security policy and/or the PDU session ID.

Optionally, the message carries the service configuration information in step 59.

Optionally, step 511: The access device determines, based on common information in the service configuration information, that the service is used to transmit multicast service data. This process is the same as step 311 in FIG. 3A and FIG. 3B, and repeated descriptions are not provided again.

Step 512: The access device creates the multicast DRB, determines the user plane security active state of the multicast DRB based on the first multicast security policy in step 510, and may further configure security for a multicast PDCP layer entity, to transmit the multicast service data. Optionally, the user plane security active state of the unicast DRB may be further modified, and a configured PDCP layer entity of the unicast DRB may be modified. For example, the user plane security active state of the corresponding unicast DRB is modified based on the unicast security policy and/or the PDU session identifier in step 510; or even if the unicast security policy and/or the PDU session identifier are/is not included in step 510, the terminal may modify the user plane security active state of the unicast DRB based on the user plane security active state of the multicast DRB.

Step 513: The access device may further send a first indication to the terminal, where the first indication may be used to indicate the user plane security active state of the multicast DRB in a PDU session. Correspondingly, UE receives the first indication from the access device. For example, the access device sends the first indication by using RRC reconfiguration information. The RRC reconfiguration message herein may correspond to the first message in step 203 in FIG. 2, and the first indication may correspond to the first indication in step 203 in FIG. 2.

If the access device receives the unicast security policy and/or the PDU session ID, the access device may further send indication information to the terminal, to indicate the terminal to modify the user plane security active state of the unicast DRB based on the user plane security active state of the multicast DRB. For details, refer to the second indication, the third indication, and the fourth indication in the first message in step 203 in FIG. 2 described above. Details are not described herein again.

Alternatively, it is specified in a protocol that multicast is used as a baseline. Even if the access device does not receive the unicast security policy and/or the PDU session ID, the access device may send the second indication, the third indication, and the fourth indication to the terminal, to indicate the terminal to modify the user plane security active state of the unicast DRB based on the user plane security active state of the multicast DRB.

Alternatively, it is specified in a protocol that multicast is used as a baseline. Even if the access device does not send at least one piece of indication information of the second indication, the third indication, and the fourth indication to the terminal, to indicate the terminal to modify the user plane security active state of the unicast DRB based on the user plane security active state of the multicast DRB, the terminal modifies the user plane security active state of the unicast DRB.

A sequence of step 512 and step 513 may not be limited.

Step 514 to step 521 are the same as step 314 to step 321 in FIG. 3A and FIG. 3B, and repeated descriptions are not provided again.

In conclusion, FIG. 5A and FIG. 5B describes the communication process in which the SMF device determines, with reference to the user plane security active state of the unicast DRB and the second multicast security policy, to use any one of the manner 1 to the manner 3.

Figure 6:
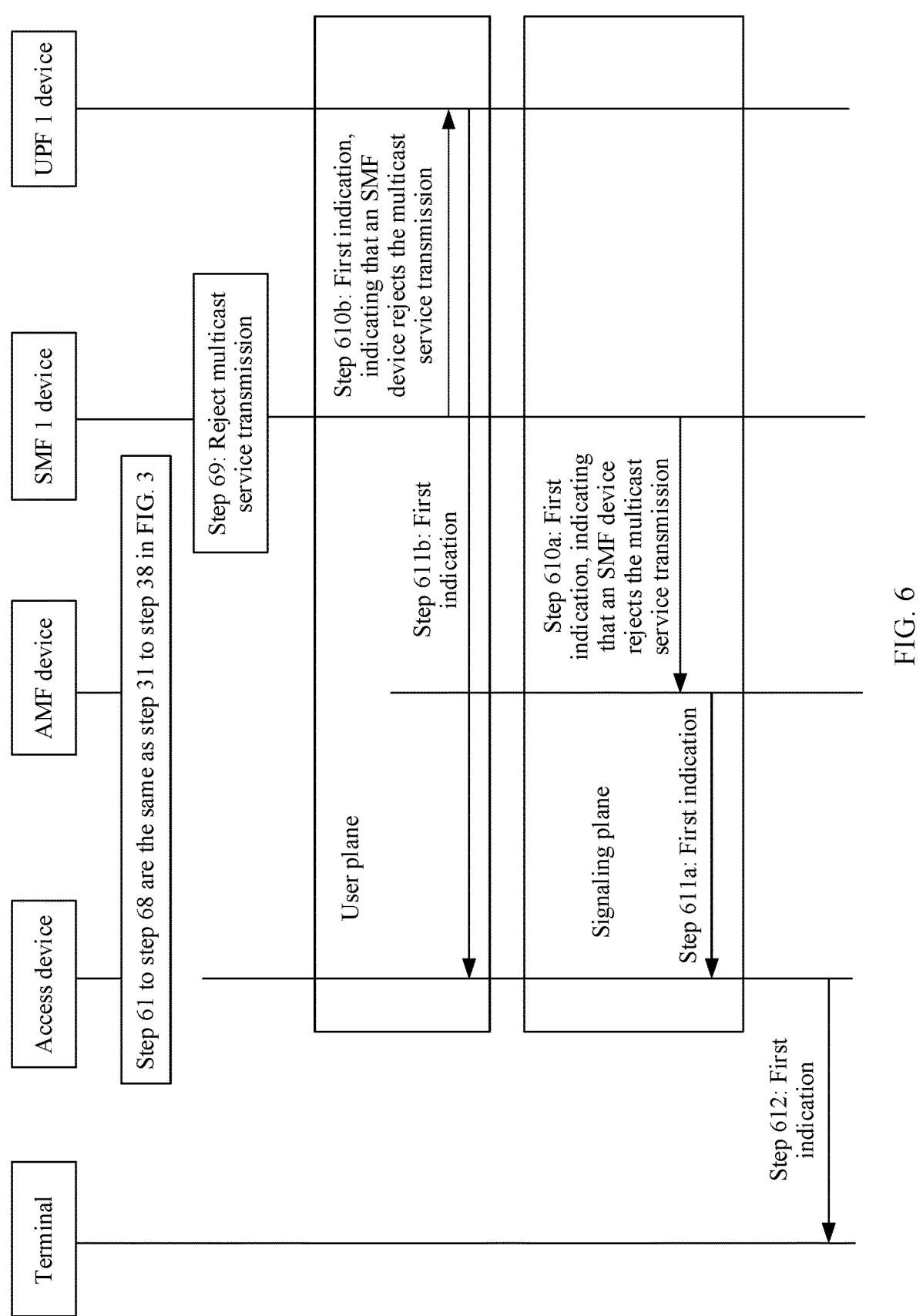
FIG. 6 is a schematic diagram of a possible communication process according to an embodiment of this application.

Next. FIG. 6 is a schematic diagram of a communication process in which an SMF device determines, with reference to a user plane security active state of a unicast DRB and a second multicast security policy, to use the manner 4: rejecting multicast service transmission. A first message, a first indication, and a second indication in this example are irrelevant to the first message, the first indication, and the second indication in the foregoing examples in FIG. 2, FIG. 3A and FIG. 3B, and FIG. 5A and FIG. 5B.

Step 61 to step 68 are the same as step 31 to step 38 in FIG. 3A and FIG. 3B, and repeated descriptions are not provided again.

Step 69: The SMF device selects the execution manner 4: rejecting multicast service data transmission.

The SMF device may determine, based on the user plane security active state of the DRB, for transmitting unicast service data, in a PDU session and the second multicast security policy, to reject the multicast service data transmission. Usually, if the user plane security active state of the unicast DRB is inconsistent with a user plane security active state, of a multicast DRB, that is indicated by the second multicast security policy, the multicast service transmission may be rejected. For an example, refer to the foregoing descriptions. Details are not described again.

In step 63, if a terminal joins a multicast service through a signaling plane, step 610*a* is performed: The SMF device sends, to an AMF device, the first indication indicating that the access device rejects the multicast service data transmission, to notify the AMF device that the access device rejects the multicast service data transmission, to perform corresponding processing. Step 611*a*: When receiving the first indication indicating that the access device rejects the multicast service data transmission, the AMF device may further notify the access device of the first indication.

In step 63, if a terminal joins a multicast service through a signaling plane, step 610*b* is performed: The SMF device sends, to a UPF 1 device, the first indication indicating that the access device rejects the multicast service data transmission, to notify the UPF device that the access device rejects the multicast service data transmission, to perform corresponding processing. Step 611*b*: When receiving the first indication indicating that the access device rejects the multicast service data transmission, the UPF 1 device may further notify the access device of the first indication.

Step 612: After receiving the first indication from the AMF or the UPF 1, the access device may notify the terminal of the first indication indicating that the access device rejects the multicast service data transmission.

Optionally, the second indication may be carried in step 610*a*, step 610*b*, step 611*a*, step 611*b*, and step 612. The second indication is used to indicate a reason why the access device rejects the multicast service data transmission. The SMF device not only notifies the AMF device or the UPF device that the SMF device rejects the multicast transmission, but also notifies the rejection reason, so that the corresponding device may perform corresponding processing. In some cases, the second indication and the first indication may alternatively be a same indication. For example, the reason for rejecting the multicast service data transmission may include: a multicast service data transmission security requirement in the PDU session is inconsistent with a unicast service data transmission security requirement, or a multicast service transmission security requirement cannot be met.

In conclusion, the communication process in which the SMF device determines, with reference to the user plane security active state of the unicast DRB and the second multicast security policy, to use the manner 4 is described.

Figure 7A:
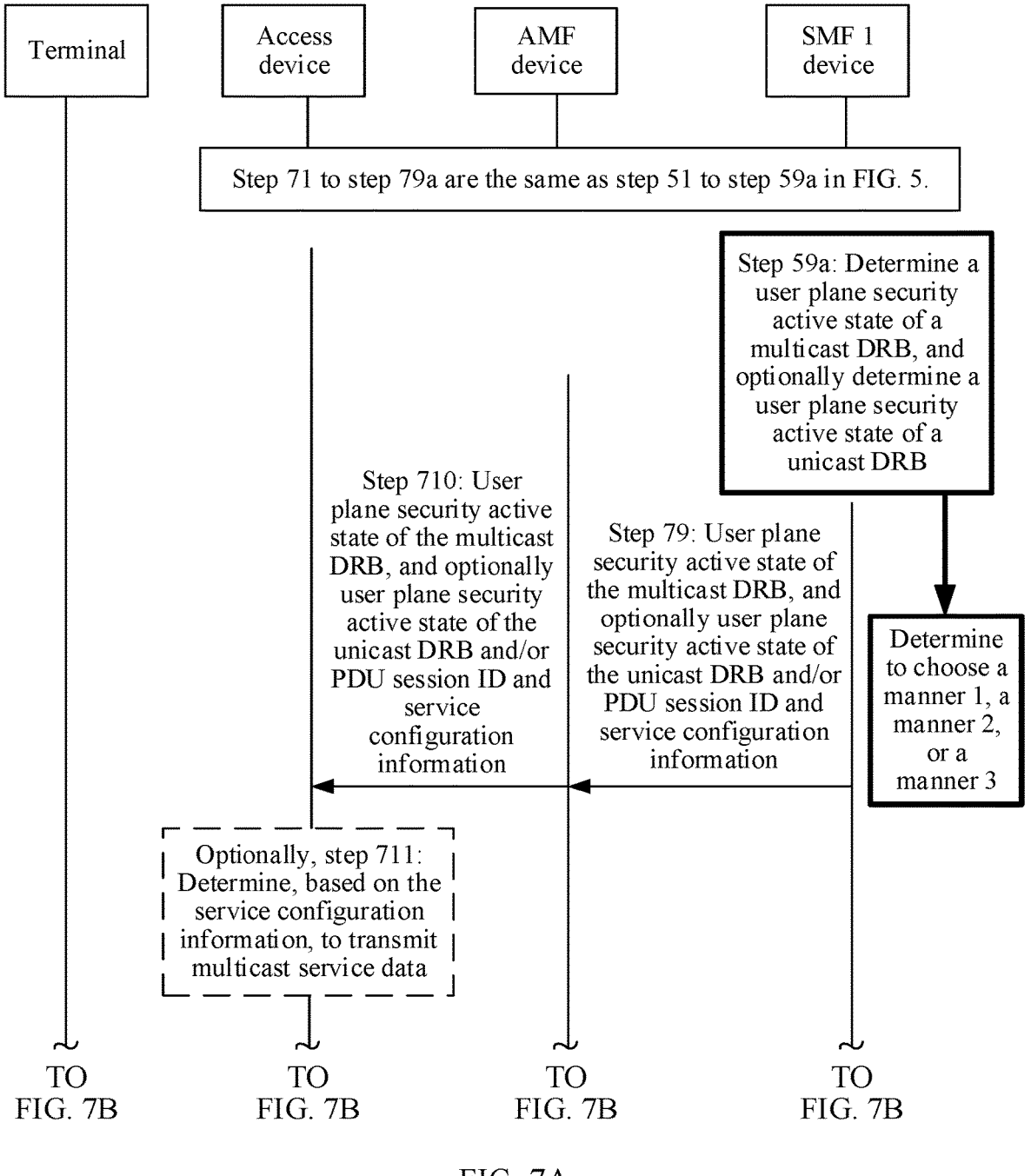

Next, with reference to FIG. 7A and FIG. 7B, another communication process in which an SMF device determines, with reference to a user plane security active state of a unicast DRB and a second multicast security policy, to use any one of the manner 1 to the manner 3 is provided. A difference from the example in FIG. 5A and FIG. 5B lies in that: in the example in FIG. 5A and FIG. 5B, the SMF device notifies an access device of the user plane security active state of the multicast DRB by using the first multicast security policy; and in the example in FIG. 7A and FIG. 7B, the SMF device directly notifies the access device of the user plane security active state of the multicast DRB.

Step 71 to step 79*a* are the same as step 51 to step 59*a* in FIG. 5A and FIG. 5B, and repeated descriptions are not provided again. After step 79*a*, an SMF 1 determines the user plane security active state of the multicast DRB, and optionally may further determine the user plane security active state of the unicast DRB.

Step 79: The SMF 1 sends the user security active state of the multicast DRB to an AMF, and optionally further sends service configuration information.

Optionally, in step 79, the user plane security active state of the unicast DRB and/or a PDU session ID may be further sent.

Step 710: After receiving the user plane security active state of the multicast DRB from the SMF 1, the AMF may send a message to the access device, where the message carries the user plane security active state of the multicast DRB in step 59, and optionally further carries the user plane security active state of the unicast DRB and/or the PDU session ID. The message may be, for example, an N2 session modification request message.

Correspondingly, the access device receives the service configuration information and the user plane security active state of the multicast DRB from the AMF, and optionally may further receive the user plane security active state of the unicast DRB and/or the PDU session ID.

Optionally, the service configuration information may be further sent to the access device.

The user plane security active state of the unicast DRB in step 79 and step 710 may alternatively be replaced with a unicast security policy, which is similar to the example in FIG. 5A and FIG. 5B.

Optionally, step 711: The access device determines, based on common information in the service configuration information, that the service is used to transmit multicast service data. This process is the same as step 311 in FIG. 3A and FIG. 3B, and a repeated part that is the same as that in step 511 in FIG. 5A and FIG. 5B is not described again.

Step 712: The access device creates the multicast DRB, and configures security for a multicast PDCP layer entity based on the user plane security active state of the multicast DRB in step 710, to transmit the multicast service data. Optionally, the user plane security active state of the unicast DRB may be further modified, and a configured PDCP layer entity of the unicast DRB may be modified. For example, the user plane security active state of the corresponding unicast DRB is modified based on the user plane security active state of the unicast DRB and/or the PDU session identifier in step 710: or even if the user plane security active state of the unicast DRB and/or the PDU session identifier are/is not included in step 710, a terminal may modify the user plane security active state of the unicast DRB based on the user plane security active state of the multicast DRB.

Step 713: The access device may further send a first indication to the terminal, where the first indication may be used to indicate the user plane security active state of the multicast DRB in a PDU session.

Optionally; the access device may also send a second indication, a third indication, and a fourth indication to the terminal, to indicate the terminal to modify the user plane security active state of the unicast DRB based on the user plane security active state of the multicast DRB.

A sequence of step 712 and step 713 may not be limited.

Step 714 to step 721 are the same as step 514 to step 521 in FIG. 5A and FIG. 5B, and repeated descriptions are not provided again.

In conclusion, FIG. 7A and FIG. 7B describes the communication process in which the SMF device determines, with reference to the user plane security active state of the unicast DRB and the second multicast security policy, to use any one of the manner 1 to the manner 3.

Figure 8:
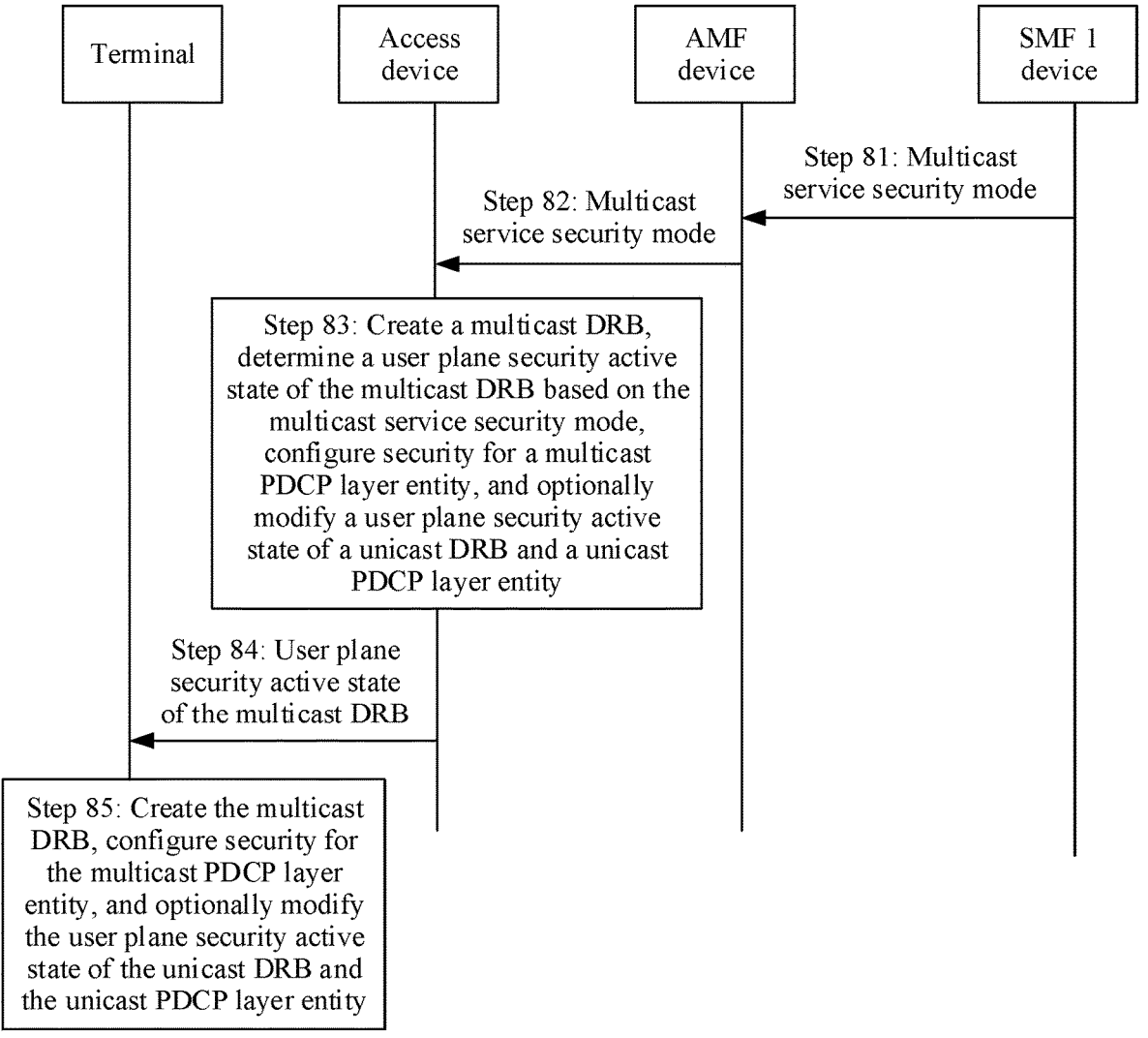
FIG. 8 is a schematic diagram of a possible communication process according to an embodiment of this application.

Next, refer to FIG. 8. A method that an access device determines, in a multicast service security mode, a user plane security active state of a DRB for transmitting a multicast service data packet is described.

Step 81: An SMF device sends the multicast service security mode to an AMF device.

The multicast service security mode may be a mode 1: in which protection is performed between UE and the access device (that is, security protection is performed between a terminal and the access device): or may be a mode 2: in which security protection is performed between UE and a core network or between a terminal and an application server (that is, security protection is performed between the terminal and the core network/the application server): or may be a mode 3: in which security protection is separately performed between UE and the access device, and between an access network device and a core network/an application server.

Step 82: After receiving the multicast service security mode from an SMF 1, the AMF sends the multicast service security mode to the access device. Correspondingly, the access device receives the multicast service security mode.

Step 83: The access device creates the multicast DRB, determines the user plane security active state of the multicast DRB in the multicast service security mode, and configures security for a multicast PDCP layer entity; to transmit multicast service data.

When the multicast service security mode is the mode in which security protection is performed between the terminal and the access device, or is the mode in which security protection is separately performed between the UE and the access device, and between the access network device and the core network/the application server, it may be determined that the user plane security active state of the multicast DRB is on.

When the multicast service security mode is the mode in which security protection is performed between the terminal and the core network or between the terminal and the application server, it may be determined that the user plane security active state of the multicast DRB is off. In this way, this can avoid security protection redundancy caused by performing security protection on the terminal and a base station on the basis that security protection has been performed between the terminal and the core network.

In the example in FIG. 8, optionally, the SMF device may further determine a user plane security active state of a unicast DRB, and deliver the user plane security active state to the access device. For example, similar to the example in FIG. 5A and FIG. 5B, the SMF device delivers a unicast security policy to the access device. For another example, similar to the example in FIG. 7A and FIG. 7B, the SMF device delivers the user plane security active state of the unicast DRB to the access device.

In the example in FIG. 8, optionally, the access device may further determine the user plane security active state of the unicast DRB, for example, similar to the example in FIG. 3A and FIG. 3B.

Optionally; the access device may further modify the user plane security active state of the unicast DRB based on the user plane security active state of the multicast DRB, and modify a configured PDCP layer entity of the unicast DRB.

Step 84: The access device sends a first indication to the terminal to indicate the user plane security active state of the multicast DRB, and optionally may further send one or more of a second indication, a third indication, and a fourth indication, to indicate to modify the user plane security active state of the unicast DRB. This is the same as the examples in FIG. 3A and FIG. 3B, FIG. 5A and FIG. 5B, and FIG. 7A and FIG. 7B, and repeated descriptions are not provided again.

Step 85: The terminal creates the multicast DRB, determines the user plane security active state of the multicast DRB, and configures security for the multicast PDCP layer entity, to transmit the multicast service data. Optionally, the terminal may further modify the user plane security active state of the unicast DRB, and modify the configured PDCP layer entity of the unicast DRB.

The example in FIG. 3A and FIG. 3B, the example in FIG. 5A and FIG. 5B, and the example in FIG. 7A and FIG. 7B may all be combined with the example in FIG. 8, to form technical solutions, and all the technical solutions fall within the protection scope of this application.

For example, the example in FIG. 8 may be combined with the example in FIG. 5A and FIG. 5B. The SMF 1 sends the unicast security policy and/or the PDU session identifier to the access device through the AMF device.

For example, the example in FIG. 8 may be combined with the example in FIG. 7A and FIG. 7B. The SMF 1 sends the user plane security active state of the unicast DRB and/or the PDU session identifier to the access device through the AMF device.

In addition, the multicast service protection mode, for example, the mode 1, the mode 2, or the mode 3, may alternatively be preconfigured in the access device. The access device may determine the user plane security active state of the multicast DRB in the preconfigured multicast service security mode without obtaining the multicast service security mode from the SMF device, and configure security for the multicast PDCP layer entity, to transmit the multicast service data.

The foregoing describes the communication methods in embodiments of this application, and the following describes communication apparatuses in embodiments of this application. The method and the apparatus are based on a same technical idea. The method and the apparatus have similar principles for resolving problems. Therefore, for implementations of the apparatus and the method, refer to each other.

Figure 9:
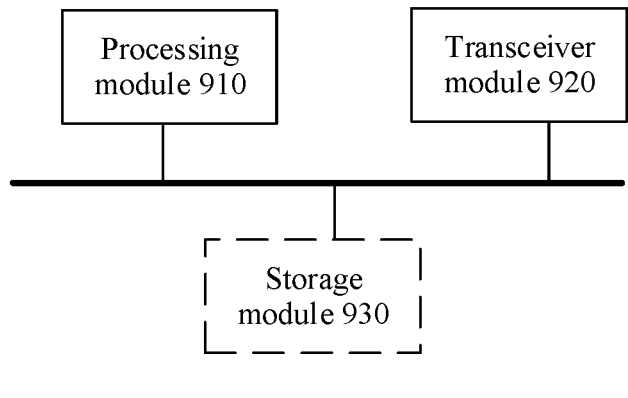
FIG. 9 is a diagram of a structure of a possible communication apparatus according to an embodiment of this application.

Based on a same technical idea as the foregoing communication method, as shown in FIG. 9, a communication apparatus 900 is provided. The apparatus 900 may include a transceiver module 920 and a processing module 910, and optionally the apparatus 900 further includes a storage module 930. The processing module 910 may be separately connected to the storage module 930 and the transceiver module 920, and the storage module 930 may also be connected to the transceiver module 920.

In an example, the apparatus 900 can perform the steps performed by the access device in the methods in FIG. 2 to FIG. 8. The apparatus 900 may be an access device, or may be a chip used in the access device.

In an example, the transceiver module 920 is configured to send a first message to a terminal, where the first message includes a first indication, the first indication is used to indicate a user plane security active state of a data radio bearer DRB, for transmitting multicast service data, in a PDU session, and the user plane security active state includes whether integrity protection is activated and/or whether confidentiality protection is activated; and the processing module 910 is configured to configure a multicast packet data convergence protocol PDCP layer entity based on the user plane security active state of the DRB for transmitting the multicast service data.

In an example, the processing module 910 is configured to determine, based on a first parameter set, the user plane security active state of the DRB for transmitting the multicast service data, where the first parameter set includes one or both of the following parameters: a user plane security active state of a DRB, for transmitting unicast service data, in the PDU session, and a second multicast security policy.

In an example, the processing module 910 is configured to determine the user plane security active state of the DRB, for transmitting the unicast service data, in the PDU session as the user plane security active state of the DRB for transmitting the multicast service data.

In an example, the processing module 910 is configured to: when the user plane security active state of the DRB for transmitting the unicast service data is on, determine the user plane security active state of the DRB, for transmitting the unicast service data, in the PDU session as the user plane security active state of the DRB for transmitting the multicast service data: or when the user plane security active state of the DRB for transmitting the unicast service data is off, and the second multicast security policy is a preferred policy or a "not needed" policy, determine the user plane security active state of the DRB, for transmitting the unicast service data, in the PDU session as the user plane security active state of the DRB for transmitting the multicast service data, where the preferred policy is used to indicate that the user plane security active state of the DRB for transmitting the multicast service data is on or off; and the "not needed" policy is used to indicate that the user plane security active state of the DRB for transmitting the multicast service data is off.

In an example, the processing module 910 is configured to determine, based on the second multicast security policy, the user plane security active state of the DRB for transmitting the multicast service data, where the second multicast security policy is a required policy, a preferred policy, or a "not needed" policy; the required policy is used to indicate that the user plane security active state of the DRB for transmitting the multicast service data is on, the preferred policy is used to indicate that the user plane security active state of the DRB for transmitting the multicast service data is on or off, and the "not needed" policy is used to indicate that the user plane security active state of the DRB for transmitting the multicast service data is off.

In an example, the processing module 910 is configured to: when the user plane security active state of the DRB for transmitting the unicast service data is on or off, and the second multicast security policy is the required policy or the "not needed" policy, determine, based on the second multicast security policy; the user plane security active state of the DRB, for transmitting the multicast service data, in the PDU session.

In an example, the first message further includes one or more of the following indications: a second indication, a third indication, and a fourth indication; the second indication is used to indicate the terminal to modify the user plane security active state of the DRB, for transmitting the unicast service data, in the PDU session to the user plane security active state of the DRB for transmitting the multicast service data, or the second indication is used to indicate a modified user plane security active state of the DRB, for transmitting the unicast service data, in the PDU session: the third indication is an identifier of the DRB whose user plane security active state needs to be modified; and the fourth indication is used to indicate the terminal to modify the user plane security active state of the DRB, for transmitting the unicast service data, in the PDU session.

In an example, the processing module 910 is configured to: when the user plane security active state of the DRB for transmitting the unicast service data is off or on, and the second multicast security policy is the required policy; send the first message to the terminal through the transceiver module 920. Optionally, the first message includes one or more of the second indication, the third indication, or the fourth indication.

In an example, when rejecting multicast service data transmission, the transceiver module 920 is configured to send a first message to an SMF device, where the first message includes a first indication, and the first indication is used to indicate that the apparatus rejects the multicast service data transmission.

In an example, the processing module 910 is configured to determine, based on a user plane security active state of a DRB, for transmitting unicast service data, in a PDU session and a second multicast security policy, to reject the multicast service data transmission.

In an example, the processing module 910 is configured to: when the user plane security active state of the DRB for transmitting the unicast service data is on, and the second multicast security policy is a "not needed" policy, determine to reject the multicast service data transmission, where the "not needed" policy is used to indicate that a user plane security active state of a DRB for transmitting multicast service data is off: or when the user plane security active state of the DRB for transmitting the unicast service data is off, and the second multicast security policy is a required policy, determine to reject the multicast service data transmission, where the required policy is used to indicate that a user plane security active state of a DRB for transmitting multicast service data is on.

In an example, the transceiver module 920 is configured to receive, through an AMF device, a first message sent by an SMF device, where the first message includes a first multicast security policy in a PDU session, the first multicast security policy is a required policy or a "not needed" policy, the required policy indicates that a user plane security active state of a DRB for transmitting multicast service data is on, and the "not needed" policy indicates that the user plane security active state of the DRB for transmitting the multicast service data is off; and the processing module 910 is configured to: determine, based on the first multicast security policy, the user plane security active state of the DRB for transmitting the multicast service data, and configure a multicast packet data convergence protocol PDCP layer entity:

In an example, the first message further includes a PDU session identifier and/or a unicast security policy; and the unicast security policy is a required policy or a "not needed" policy, the required policy is used to indicate that a user plane security active state of the DRB for transmitting unicast service data is on, and the "not needed" policy indicates that the user plane security active state of the DRB for transmitting the unicast service data is off.

In an example, the processing module 910 is configured to modify, based on the unicast security policy and the PDU session identifier, the user plane security active state of the DRB, for transmitting the unicast service data, in the identified PDU session.

In an example, the storage module 930 may store computer-executable instructions of the method on the access device side, so that the processing module 910 performs the method in the foregoing examples.

Figure 10:
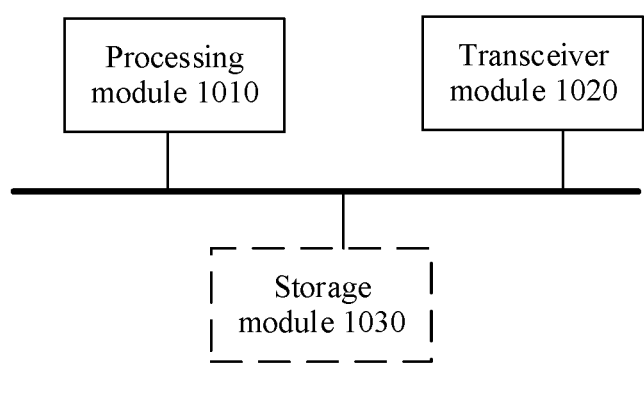
FIG. 10 is a diagram of a structure of a possible communication apparatus according to an embodiment of this application.

Based on a same technical idea as the foregoing communication method, as shown in FIG. 10, a communication apparatus 1000 is provided. The apparatus 1000 may include a transceiver module 1020 and a processing module 1010, and optionally further includes a storage module 1030. The processing module 1010 may be separately connected to the storage module 1030 and the transceiver module 1020, and the storage module 1030 may also be connected to the transceiver module 1020.

In an example, the apparatus 1000 can perform the steps performed by the terminal device in the methods in FIG. 2 to FIG. 8. The apparatus 1000 may be a terminal device, or may be a chip used in the terminal device.

In an example, the transceiver module 1020 is configured to receive a first message from an access device, where the first message includes a first indication, the first indication is used to indicate a user plane security active state of a DRB, for transmitting multicast service data, in a PDU session, and the user plane security active state includes whether integrity protection is activated and/or whether confidentiality protection is activated; and the processing module 1010 is configured to configure a multicast packet data convergence protocol PDCP layer entity based on the user plane security active state of the DRB for transmitting the multicast service data.

In an example, the first message further includes one or more of the following indications: a second indication, a third indication, and a fourth indication: the second indication is used to indicate the apparatus to modify a user plane security active state of a DRB, for transmitting unicast service data, in the PDU session to the user plane security active state of the DRB for transmitting the multicast service data, or the second indication is used to indicate a modified user plane security active state of a DRB, for transmitting unicast service data, in the PDU session: the third indication is an identifier of the DRB whose user plane security active state needs to be modified; and the fourth indication is used to indicate the apparatus to modify the user plane security active state of the DRB, for transmitting the unicast service data, in the PDU session.

In an example, when the first message comprises the second indication, the processing module 1010 is further configured to modify, based on the user plane security active state of the DRB for transmitting the multicast service data or the modified user plane security active state of the DRB for transmitting the unicast service data, the user plane security active state of the DRB for transmitting the unicast service data.

In an example, when the first message includes the third indication, the processing module 1010 is further configured to modify the user plane security active state of the identified DRB.

In an example, when the first message includes the fourth indication, the processing module 1010 is further configured to modify the user plane security active state of the DRB for transmitting the unicast service data.

In an example, the storage module 1030 may store computer-executable instructions of the method on the terminal device side, so that the processing module 1010 performs the method in the foregoing examples.

Figure 11:
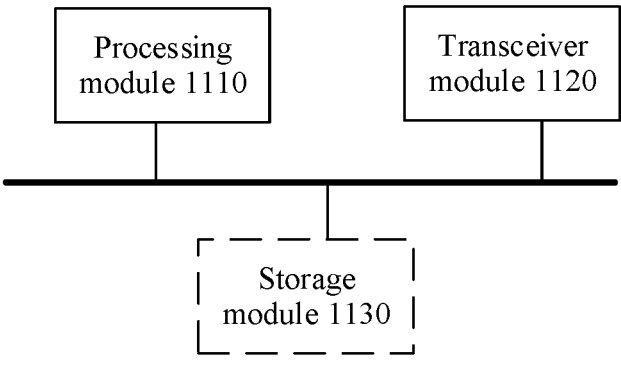
FIG. 11 is a diagram of a structure of a possible communication apparatus according to an embodiment of this application.

Based on a same technical idea as the foregoing communication method, as shown in FIG. 11, a communication apparatus 1100 is provided. The apparatus 1100 may include a transceiver module 1120 and a processing module 1110, and optionally further includes a storage module 1130. The processing module 1110 may be separately connected to the storage module 1130 and the transceiver module 1120, and the storage module 1130 may also be connected to the transceiver module 1120.

In an example, the apparatus 1100 can perform the steps performed by the SMF device in the methods in FIG. 2 to FIG. 8. The apparatus 1000 may be an SMF device, or may be a chip used in the SMF device.

In an example, the transceiver module 1120 is configured to send a first message to an access device through an AMF device, where the first message includes a first multicast security policy in a PDU session, the first multicast security policy is a required policy or a "not needed" policy, the required policy indicates that a user plane security active state of a DRB for transmitting multicast service data is on, and the "not needed" policy indicates that the user plane security active state of the DRB for transmitting the multicast service data is off.

In an example, the processing module 1110 is configured to determine the first multicast security policy based on a second parameter set, where the second parameter set includes one or both of the following parameters: a user plane security active state of a DRB, for transmitting unicast service data, in the PDU session, and a second multicast security policy.

In an example, the processing module 1110 is configured to determine the first multicast security policy based on the user plane security active state of the DRB, for transmitting the unicast service data, in the PDU session.

In an example, the processing module 1110 is configured to: when the plane security active state of the DRB for transmitting the unicast service data is on, determine the first multicast security policy based on the user plane security active state of the DRB, for transmitting the unicast service data, in the PDU session: or when the user plane security active state of the DRB for transmitting the unicast service data is off, and the second multicast security policy is a preferred policy or a "not needed" policy, determine the first multicast security policy based on the user plane security active state of the DRB, for transmitting the unicast service data, in the PDU session, where the preferred policy is used to indicate that the user plane security active state of the DRB for transmitting the multicast service data is on or off, and the "not needed" policy is used to indicate that the user plane security active state of the DRB for transmitting the multicast service data is off.

In an example, the processing module 1110 is configured to determine the first multicast security policy based on the second multicast security policy.

In an example, the processing module 1110 is configured to: when the user plane security active state of the DRB for transmitting the unicast service data is on or off, and the second multicast security policy is a required policy or a "not needed" policy, determine the first multicast security policy based on the second multicast security policy.

In an example, the first message further includes a PDU session identifier and/or a unicast security policy; and the unicast security policy is a required policy or a "not needed" policy, the required policy is used to indicate that a user plane security active state of the DRB for transmitting unicast service data is on, and the "not needed" policy indicates that the user plane security active state of the DRB for transmitting the unicast service data is off.

In an example, the processing module 1110 is configured to: when the user plane security active state of the DRB for transmitting the unicast service data is off or on, and the second multicast security policy is a required policy, send the first message to the access device through the transceiver module 1120.

In an example, the processing module 1110 is configured to: when the multicast service security mode is a mode of performing security protection between a terminal and a core network, determine that the second multicast security policy is not needed.

In an example, the transceiver module 1120 is configured to: when rejecting multicast service data transmission, send a first message to an access device through an AMF device or a UPF device, where the first message includes a first indication, and the first indication is used to indicate that the apparatus rejects the multicast service data transmission.

In an example, the first message further includes a second indication, and the second indication is used to indicate a reason why the apparatus device rejects the multicast service data transmission.

In an example, the processing module 1110 is configured to determine, based on a user plane security active state of a DRB, for transmitting unicast service data, in a PDU session and a second multicast security policy, to reject the multicast service data transmission.

In an example, the processing module 1110 is configured to: when the user plane security active state of the DRB for transmitting the unicast service data is on, and the second multicast security policy is a "not needed" policy, determine to reject the multicast service data transmission, where the "not needed" policy is used to indicate that a user plane security active state of a DRB for transmitting multicast service data is off: or when the user plane security active state of the DRB for transmitting the unicast service data is off, and the second multicast security policy is a required policy, determine to reject the multicast service data transmission, where the required policy is used to indicate that a user plane security active state of a DRB for transmitting multicast service data is on.

In an example, the storage module 1130) may store computer-executable instructions of the method on the SMF device side, so that the processing module 1110 performs the method in the foregoing examples.

The storage module may include one or more memories. The memory may be a component configured to store a program or data in one or more devices or circuits. The storage module may be a register, a cache, a RAM, or the like. The storage module may be integrated with the processing module. The storage module may be a read-only memory (ROM) or another type of static storage device that can store static information and instructions, and the storage module may be independent of the processing module.

The transceiver module may be an input/output interface, a pin, a circuit, or the like.

Figure 12:
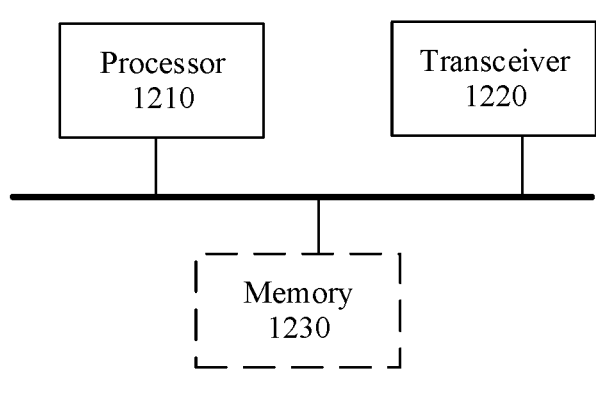
FIG. 12 is a diagram of a structure of a possible communication apparatus according to an embodiment of this application.

In addition, as shown in FIG. 12, this application provides another communication apparatus. It should be understood that the apparatus can perform the steps performed by the access device, the SMF device, and the terminal in the methods in FIG. 2 to FIG. 8. The apparatus 1200 includes a processor 1210 and a transceiver 1220, and optionally further includes a memory 1230. The transceiver may be configured to receive program instructions and transmit the program instructions to the processor, or the transceiver may be configured to perform communication interaction between the apparatus and another communication device, for example, exchange control signaling and/or service data. The transceiver may be a code and/or data read/write transceiver, or the transceiver may be a signal transmission transceiver between a communication processor and a transceiver. The processor 1210 and the memory 1230 are electrically coupled.

For example, the memory 1230 is configured to store a computer program. The processor 1210 may be configured to invoke the computer program or instructions stored in the memory, to perform the foregoing communication method, or perform the foregoing communication method through the transceiver 1220.

The processing module 910 in FIG. 9, the processing module 1010 in FIG. 10, and the processing module 1110 in FIG. 11 may be implemented through the processor 1210.

The transceiver module 920 in FIG. 9, the transceiver module 1020 in FIG. 10, and the transceiver module 1120 in FIG. 11 may be implemented through the transceiver 1220.

The storage module 930 in FIG. 9, the storage module 1030 in FIG. 10, and the storage module 1130 in FIG. 11 may be implemented through the memory 1230.

The foregoing processor may be a central processing unit (CPU), a network processor (NP), or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or any combination thereof. The general-purpose processor may be a microprocessor, or the processor may be any conventional processor or the like.

It should be further understood that the memory mentioned in embodiments of this application may be a volatile memory or a nonvolatile memory; or may include both a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this application aims to include but is not limited to these memories and any memory of another proper type.

The transceiver in embodiments of this application may be an interface circuit, or the transceiver may include a separate transmitter and/or a separate receiver, or the transmitter and the receiver may be integrated. The interface circuit or the transceiver may work according to an indication of a corresponding processor. Optionally, the transmitter may correspond to a transmitter machine in a physical device, and the receiver may correspond to a receiver machine in the physical device.

An embodiment of this application further provides a computer storage medium. The computer storage medium stores a computer program. When the computer program is executed by a computer, the computer is enabled to perform the communication methods in FIG. 2 to FIG. 8.

An embodiment of this application further provides a computer program product including instructions. When the computer program product runs on a computer, the computer is enabled to perform the communication methods in FIG. 2 to FIG. 8.

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects. "A plurality of" in this application means two or more. In addition, it should be understood that, in the descriptions of this application, terms such as "first" and "second" are merely used for differentiation and description, but cannot be understood as indicating or implying relative importance, and cannot be understood as indicating or implying a sequence.

Persons skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn the basic concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication apparatus, comprising: a transceiver; at least one processor; and one or more memories coupled to the at least one processor and storing programming instructions for execution by the at least one processor to cause the communication apparatus to:

send a first message to a terminal, wherein the first message comprises a first indication, the first indication is used to indicate a user plane security active state of a data radio bearer (DRB) for transmitting multicast service data that is different from a user plane security active state of a DRB for transmitting unicast service data in a same protocol data unit (PDU) session and the user plane security active state indicates at least one of integrity protection being activated or confidentiality protection being activated; and configure a multicast packet data convergence protocol (PDCP) layer entity based on the user plane security active state of the DRB for transmitting the multicast service data.

2. The communication apparatus according to claim 1, wherein the programming instructions, when executed by the at least one processor, cause the communication apparatus to:

determine, based on a first parameter set, the user plane security active state of the DRB for transmitting the multicast service data, wherein the first parameter set comprises one or both of the following parameters:

the user plane security active state of the DRB for transmitting the unicast service data in the PDU session or a multicast security policy.

3. The communication apparatus according to claim 2, wherein the programming instructions, when executed by the at least one processor, cause the communication apparatus to:

determine based on the multicast security policy, the user plane security active state of the DRB for transmitting the multicast service data, wherein the multicast security policy is a required policy, a preferred policy, or a "not needed" policy, the required policy is used to indicate that the user plane security active state of the DRB for transmitting the multicast service data is on, the preferred policy is used to indicate that the user plane security active state of the DRB for transmitting the multicast service data is on or off, and the "not needed" policy is used to indicate that the user plane security active state of the DRB for transmitting the multicast service data is off.

4. The communication apparatus according to claim 3, wherein the programming instructions, when executed by the at least one processor, cause the communication apparatus to:

when the user plane security active state of the DRB for transmitting the unicast service data is on or off, and when the multicast security policy is the required policy or the "not needed" policy, determine based on the multicast security policy, the user plane security active state of the DRB, for transmitting the multicast service data in the PDU session.

5. The communication apparatus according to claim 3, wherein the first message further comprises one or more of the following indications: a second indication, a third indication, or a fourth indication;

the second indication is used to indicate a modified user plane security active state of the DRB for transmitting the unicast service data in the PDU session;

the third indication is an identifier of the DRB whose user plane security active state needs to be modified; and the fourth indication is used to indicate the terminal to modify the user plane security active state of the DRB, for transmitting the unicast service data in the PDU session.

6. The communication apparatus according to claim 5, wherein the programming instructions, when executed by the at least one processor, cause the communication apparatus to:

when the user plane security active state of the DRB for transmitting the unicast service data is off or on, and the multicast security policy is the required policy, send the first message to the terminal.

7. A communication method, wherein the method comprises:

receiving, by a terminal, a first message from an access device, wherein the first message comprises a first indication, the first indication is used to indicate a user plane security active state of a data radio bearer (DRB) for transmitting multicast service data that is different from a user plane security active state of a DRB for transmitting unicast service data in a same protocol data unit (PDU) session and the user plane security active state indicates at least one of integrity protection being activated or confidentiality protection being activated; and configuring, by the terminal, a multicast packet data convergence protocol (PDCP) layer entity based on the user plane security active state of the DRB for transmitting the multicast service data.

8. The method according to claim 7, wherein the first message further comprises one or more of the following indications: a second indication, a third indication, or a fourth indication;

the second indication is used to indicate a modified user plane security active state of a DRB, for transmitting unicast service data in the PDU session;

the third indication is an identifier of the DRB whose user plane security active state needs to be modified; and the fourth indication is used to indicate the terminal to modify the user plane security active state of the DRB for transmitting the unicast service data in the PDU session.

9. The method according to claim 8 further comprises:

when the first message comprises the second indication, modifying, by the terminal based on the user plane security active state of the DRB for transmitting the multicast service data or the modified user plane security active state of the DRB for transmitting the unicast service data, the user plane security active state of the DRB for transmitting the unicast service data.

10. The method according to claim 8, further comprising:

when the first message comprises the third indication, modifying, by the terminal, the user plane security active state of the identified DRB.

11. The method according to claim 8, further comprising:

when the first message comprises the fourth indication, modifying, by the terminal, the user plane security active state of the DRB for transmitting the unicast service data.

12. A communication apparatus, comprising: a transceiver; at least one processor; and one or more memories coupled to the at least one processor and storing programming instructions for execution by the at least one processor to cause the communication apparatus to:

receive a first message from an access device, wherein the first message comprises a first indication, the first indication is used to indicate a user plane security active state of a data radio bearer (DRB) for transmitting multicast service data that is different from a user plane security active state of a DRB for transmitting unicast service data in a same protocol data unit (PDU) session, and the user plane security active state indicates at least one of integrity protection being activated or confidentiality protection being activated; and configure a multicast packet data convergence protocol (PDCP) layer entity based on the user plane security active state of the DRB for transmitting the multicast service data.

13. The communication apparatus according to claim 12, wherein the first message further comprises one or more of the following indications: a second indication, a third indication, or a fourth indication;

the second indication is used to indicate a modified user plane security active state of a DRB for transmitting unicast service data in the PDU session;

the third indication is an identifier of the DRB whose user plane security active state needs to be modified; and the fourth indication is used to indicate the communication apparatus to modify the user plane security active state of the DRB for transmitting the unicast service data in the PDU session.

14. The communication apparatus according to claim 13, wherein the programming instructions, when executed by the at least one processor, cause the communication apparatus to:

when the first message comprises the second indication, modify, based on the user plane security active state of the DRB for transmitting the multicast service data or the modified user plane security active state of the DRB for transmitting the unicast service data, the user plane security active state of the DRB for transmitting the unicast service data.

15. The communication apparatus according to claim 13, wherein the programming instructions, when executed by the at least one processor, cause the communication apparatus to:

when the first message comprises the third indication, modify the user plane security active state of the identified DRB.

16. The communication apparatus according to claim 13, wherein the programming instructions, when executed by the at least one processor, cause the communication apparatus to:

when the first message comprises the fourth indication, modify the user plane security active state of the DRB for transmitting the unicast service data.

* * * * *